(12) United States Patent
Ichikawa

(10) Patent No.: US 11,108,945 B2
(45) Date of Patent: Aug. 31, 2021

(54) ELECTRONIC APPARATUS, METHOD FOR CONTROLLING THE ELECTRONIC APPARATUS, AND STORAGE MEDIUM

(71) Applicant: CANON KABUSHIKI KAISHA, Tokyo (JP)

(72) Inventor: Sho Ichikawa, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/900,693

(22) Filed: Jun. 12, 2020

(65) Prior Publication Data

US 2020/0396373 A1    Dec. 17, 2020

(30) Foreign Application Priority Data

Jun. 17, 2019   (JP) .............................. JP2019-112316

(51) Int. Cl.
*H04N 5/232* (2006.01)
*G03B 13/36* (2021.01)
*G06F 3/01* (2006.01)
*G03B 13/02* (2021.01)

(52) U.S. Cl.
CPC ......... *H04N 5/23212* (2013.01); *G03B 13/02* (2013.01); *G03B 13/36* (2013.01); *G06F 3/013* (2013.01); *H04N 5/23219* (2013.01)

(58) Field of Classification Search
None
See application file for complete search history.

(56) References Cited

U.S. PATENT DOCUMENTS

| 2014/0308988 A1* | 10/2014 | Thorn .................... G03B 13/36 455/556.1 |
| 2020/0382693 A1* | 12/2020 | Fujiwara ............ H04N 5/23212 |
| 2020/0393898 A1* | 12/2020 | Ichikawa ......... H04N 5/232945 |
| 2020/0396373 A1* | 12/2020 | Ichikawa ............... G03B 13/36 |
| 2021/0034150 A1* | 2/2021 | Hagiwara ........ H04N 5/232127 |

FOREIGN PATENT DOCUMENTS

| JP | 2001-100903 A | 4/2001 |
| JP | 2015-022208 A | 2/2015 |
| JP | 2018-037893 A | 3/2018 |

* cited by examiner

*Primary Examiner* — William B Perkey
(74) *Attorney, Agent, or Firm* — Canon U.S.A., Inc. IP Division

(57) ABSTRACT

An eye direction reception unit receives an eye direction input of a selected position based on an eye tracking process, an operation reception unit receives a touch operation on a region of a specific operation member, the operation reception unit receives a moving operation for moving the selected position and a predetermined operation different from the moving operation on the specific operation member, and a control unit performs control such that the selected position is not moved based on the eye direction input in a case where the predetermined operation is being made, and the selected position is moved based on the eye direction input received by the eye direction reception unit in a case where the predetermined operation is not being made.

29 Claims, 8 Drawing Sheets

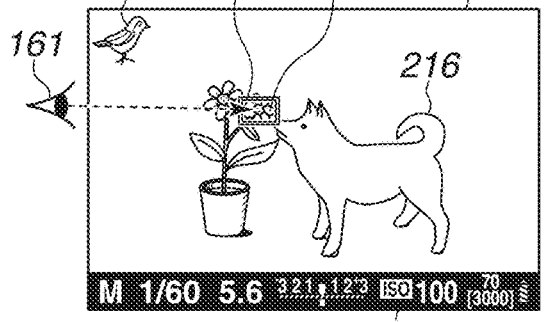
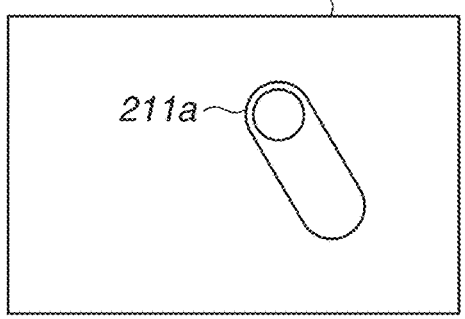
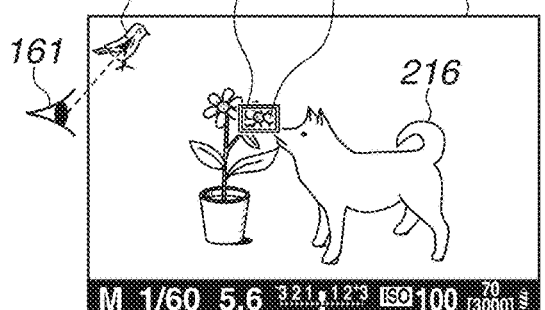
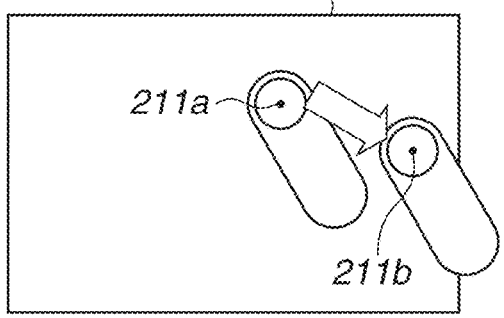
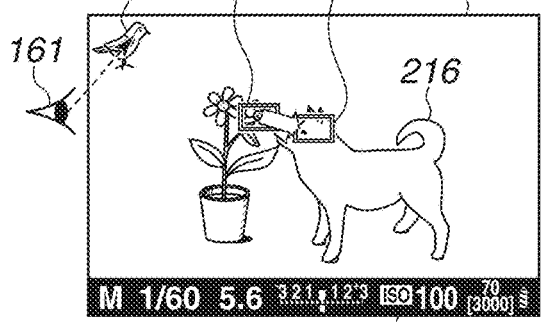
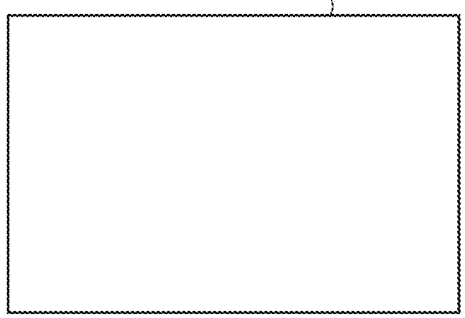
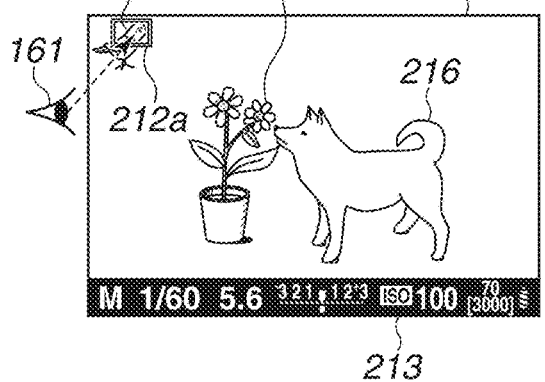

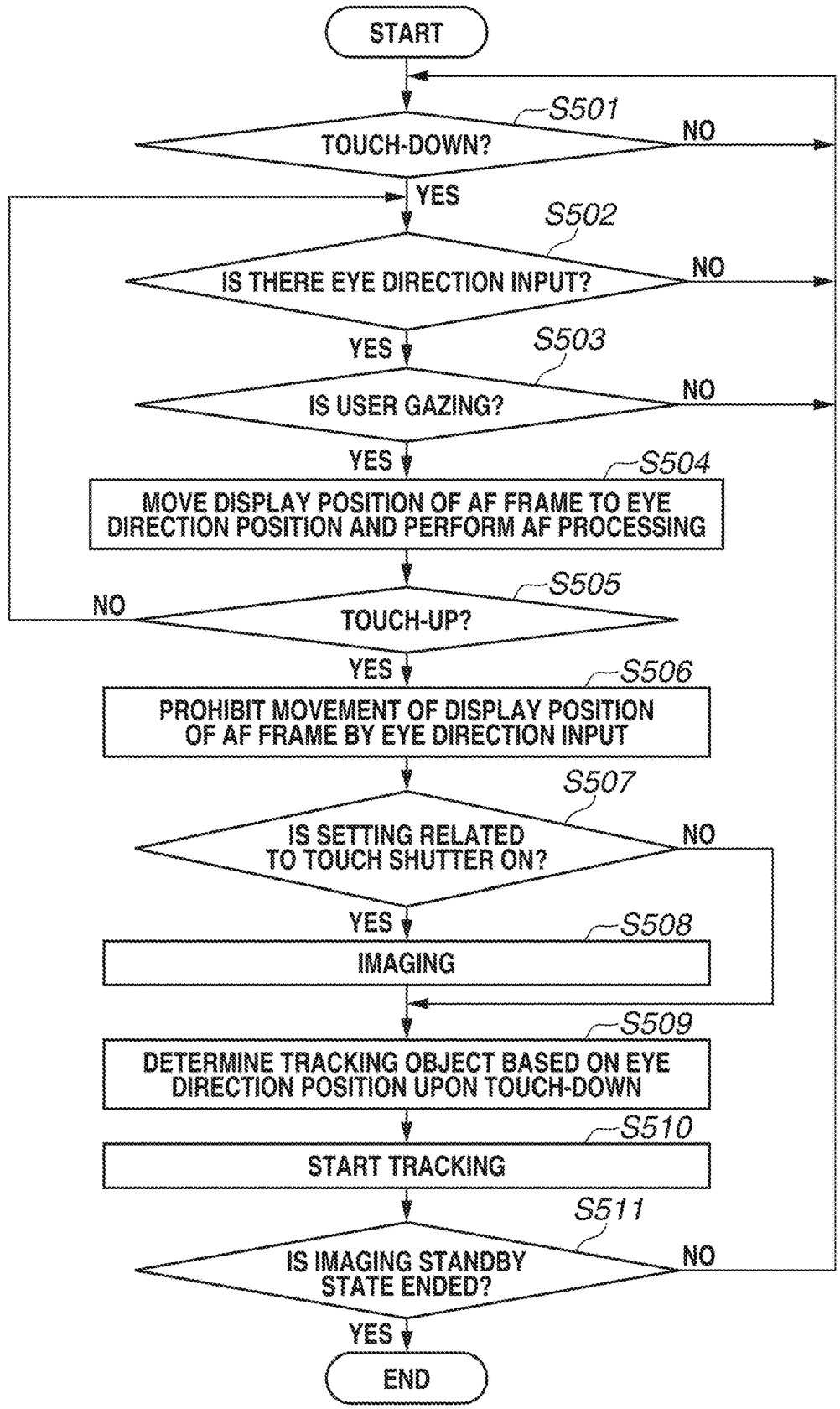

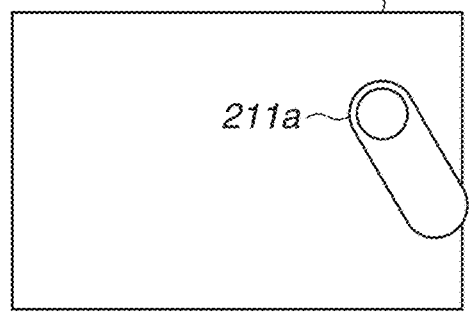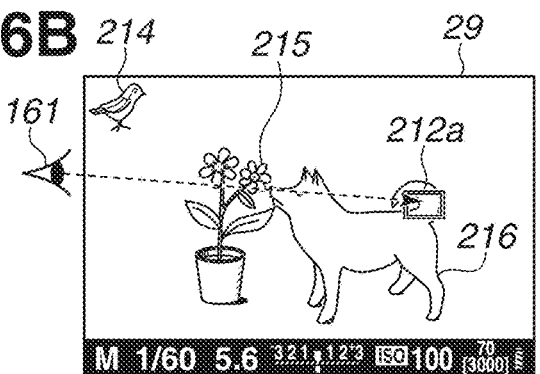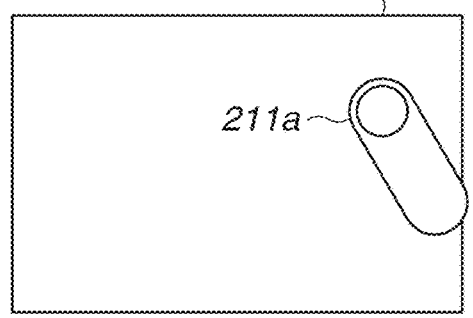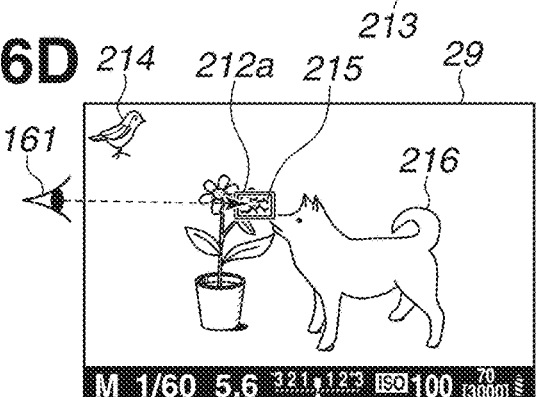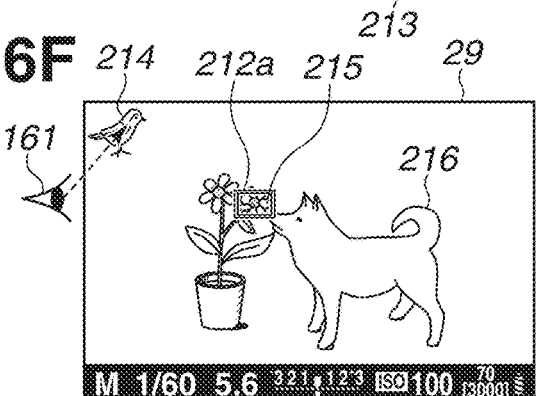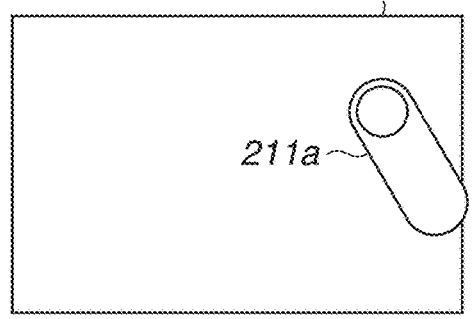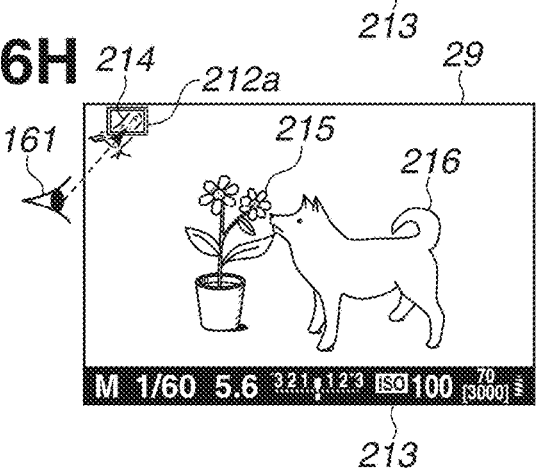

ELECTRONIC APPARATUS, METHOD FOR CONTROLLING THE ELECTRONIC APPARATUS, AND STORAGE MEDIUM

BACKGROUND

Field of the Disclosure

The present disclosure relates to an electronic apparatus capable of an eye direction input based on an eye tracking process, a method for controlling the electronic apparatus and a storage medium.

Description of the Related Art

Cameras that detect the direction of a line of sight (eye direction) of a photographer detect which area (position) within a viewfinder field of view the photographer is observing, and control an imaging function, such as an automatic focus function have been discussed. If the photographer does not want to use the eye direction-based function, the photographer can switch from a state where the eye direction-based function is executable to a state where the eye direction-based function is not executed. Japanese Patent Application Laid-Open No. 2001-100903 discusses detection of the eye direction of a user, whereby a cursor can be moved to the detected eye direction position. According to Japanese Patent Application Laid-Open 2001-100903, a cursor follow mode where the cursor follows the eye direction position of the user can be switched on/off by any one of the following: the user's gesture, voice, eye direction, and operation.

According to Japanese Patent Application Laid-Open No. 2001-100903, the user however needs to issue an instruction using a gesture, voice, eye direction, or operation each time to switch on/off the eye direction input-based cursor follow mode. Time and labor for such operation upon each switching can be annoying. In addition, after switching the cursor follow mode on to off, the user can forget to restore the cursor follow mode from off to on.

SUMMARY

The present disclosure is directed to enabling switching whether to move a select position by an eye direction input based on a user's intention without significant time and labor consumption.

According to an aspect of the present invention, an electronic apparatus includes at least one memory and at least one processor which functions as, an eye direction reception unit configured to receive an eye direction input of a selected position based on an eye tracking process, an operation reception unit configured to receive a touch operation on a region of a specific operation member, the operation reception unit being configured to receive a moving operation for moving the selected position and a predetermined operation different from the moving operation on the specific operation member, and a control unit configured to perform control such that the selected position is not moved based on the eye direction input in a case where the predetermined operation is being made, and the selected position is moved based on the eye direction input in a case where the predetermined operation is not being made.

According to another aspect of the present invention, an electronic apparatus includes a specific operation member configured to receive an operation, and at least one memory and at least one processor which function as, an eye direction reception unit configured to receive an eye direction input that is an input of a selected position based on an eye tracking process, and a control unit configured to perform control such that, in a case where the specific operation member is being pressed, the selected position is not moved based on the eye direction input, and that, in a case where the specific operation member is not being pressed, the selected position is moved based on the eye direction input received by the eye direction reception unit.

According to yet another aspect of the present invention, an electronic apparatus includes a first operation member configured to instruct an image sensor to capture an image, a specific operation member different from the first operation member, and at least one memory and at least one processor which function as, an eye direction reception unit configured to receive an eye direction input of a selected position based on an eye tracking process, and a control unit configured to perform control such that the selected position is not moved based on the eye direction input in a case where the specific operation member is not being operated, and that the selected position is moved based on the eye direction input received by the eye direction reception unit in a case where the specific operation member is being operated.

According to further yet another aspect of the present invention, an electronic apparatus includes at least one memory and at least one processor which function as, an eye direction reception unit configured to receive an eye direction input of a selected position based on an eye tracking process, an operation reception unit configured to receive a touch operation on a region of a specific operation member, and a control unit configured to perform control such that the selected position is not moved based on the eye direction input in a case where the specific operation member is not being touched, and that the selected position is moved based on the eye direction input received by the eye direction reception unit even without a touch operation for moving the selected position in a case where the specific operation member is being touched.

Further features of the present invention will become apparent from the following description of exemplary embodiments with reference to the attached drawings.

BRIEF DESCRIPTION OF THE DRAWINGS

FIGS. 4A to 4H illustrate operation examples and display examples of the display position of the AF frame based on the eye direction input according to the first exemplary embodiment of the present invention.

FIG. 5 is a flowchart illustrating processing for controlling the AF frame based on the eye direction input according to a second exemplary embodiment of the present invention.

FIGS. 6A to 6H illustrate operation examples and display examples of the display position of the AF frame based on the eye direction input according to the second exemplary embodiment of the present invention.

DESCRIPTION OF THE EMBODIMENTS

Exemplary embodiments of the present invention will be described below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1A:
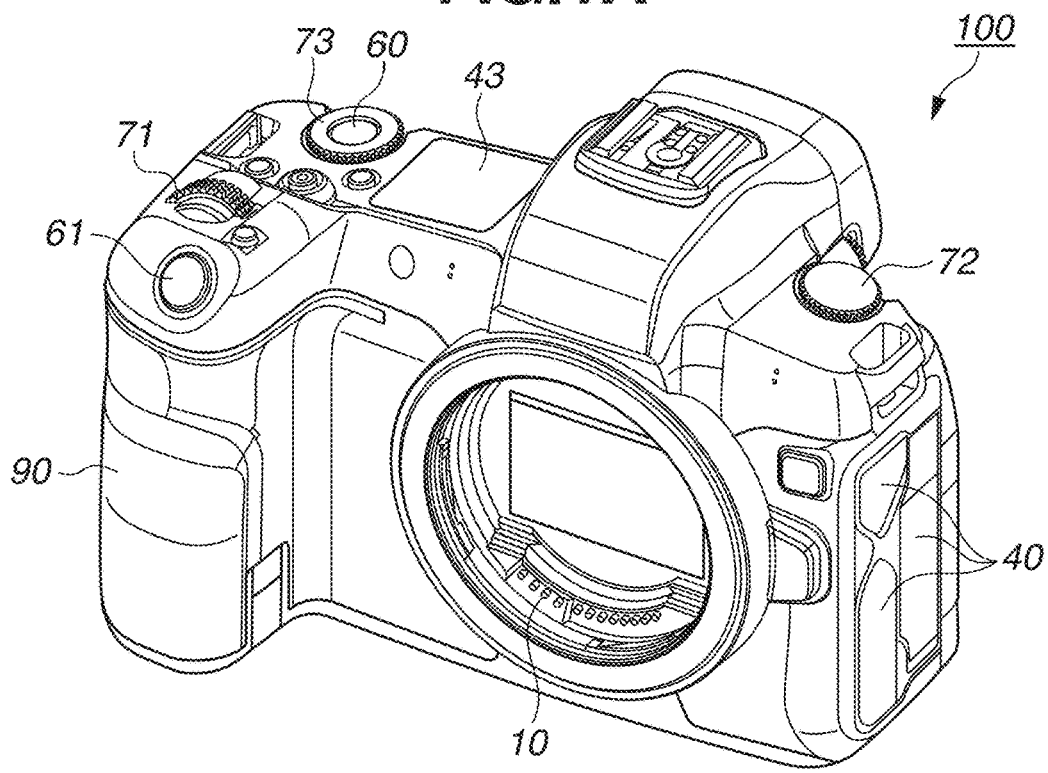
FIGS. 1A and 1B are external views of a digital camera that is an exemplary embodiment of the present invention.
Figure 1B:
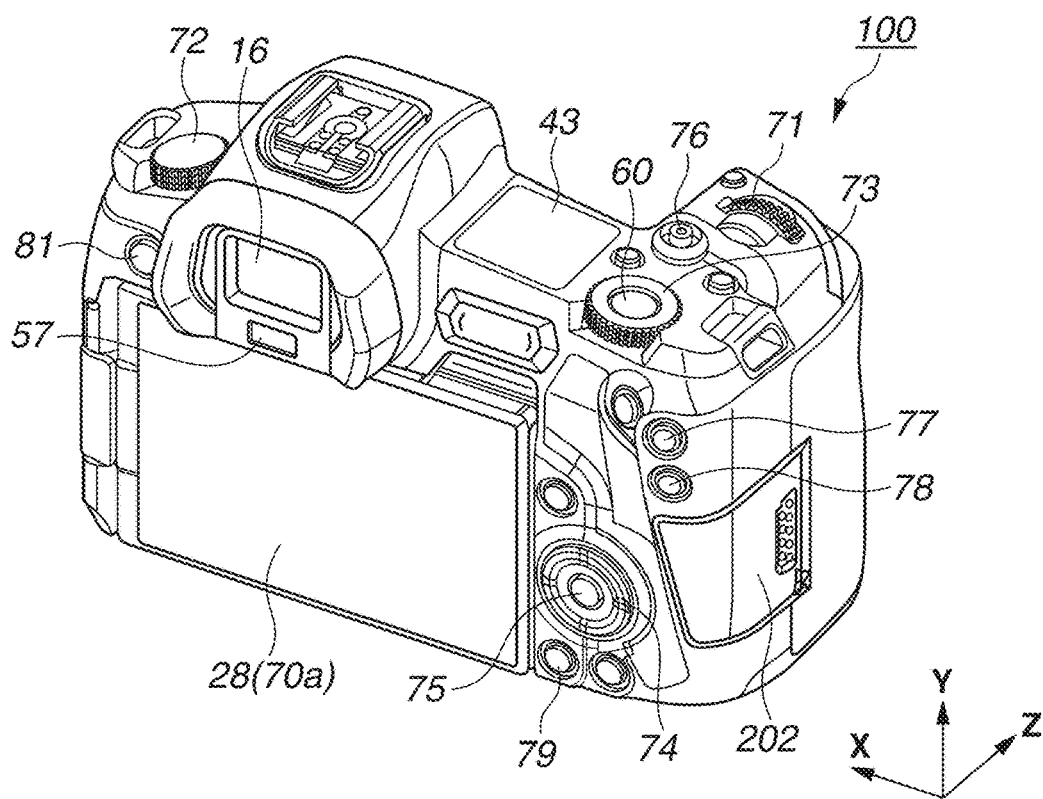

FIGS. 1A and 1B illustrate external views of a digital camera 100 in an exemplary embodiment of the present invention is applicable. FIG. 1A is a perspective front view of the digital camera 100. FIG. 1B is a perspective rear view of the digital camera 100. In FIGS. 1A and 1B, a display unit 28 is located on the rear side of the digital camera 100 and displays images and various types of information. A touch panel 70a is a touch operation member and can detect a touch operation on the display surface (operation surface) of the display unit 28. An extra-viewfinder display unit 43 is a display unit located on the top side of the digital camera 100, and displays various setting values of the digital camera 100, such as a shutter speed and an aperture value.

A shutter button 61 is an operation unit for providing an imaging instruction. A mode change switch 60 is an operation unit for switching various modes. A terminal cover 40 is a cover that protects a connector (not illustrated) for connecting a connection cable of an external apparatus to the digital camera 100. A main electronic dial 71 is a rotating operation member included in an operation unit 70. Setting values such as a shutter speed and an aperture value can be changed by rotating the main electronic dial 71. A power switch 72 is an operation member for switching on/off the power of the digital camera 100. A sub electronic dial 73 is a rotating operation member included in the operation unit 70. A selection frame can be moved and images can be fast forwarded by using the sub electronic dial 73. A four-way directional pad 74 is an operation member that is included in the operation unit 70 and includes a push button that can be pushed in four directions. Operations can be made based on the pressing direction of the four-way directional pad 74. A set button 75 is a push button included in the operation unit 70. The set button 75 is mainly used to determine a selected item. A moving image button 76 is used to give instructions to start and stop moving image capturing (recording). An automatic exposure (AE) lock button 77 is included in the operation unit 70. An exposure state can be locked by the AE lock button 77 being pressed in an imaging standby state. A zoom button 78 is an operation button included in the operation unit 70. The zoom button 78 is intended to switch on/off a zoom mode in a live view (LV) display in an imaging mode. An LV image can be magnified or reduced by operating the main electronic dial 71 with the zoom mode ON. In a playback mode, the zoom button 78 functions as an operation button for enlarging the playback image or increasing the enlargement ratio. A playback button 79 is an operation button that is included in the operation unit 70 and intended to switch between the imaging mode and the playback mode. If the playback button 79 is pressed in the imaging mode, the digital camera 100 enters the playback mode, whereby the latest image among images recorded on a recording medium 200 can be displayed on the display unit 28. A menu button 81 is included in the operation unit 70. If the menu button 81 is pressed, a menu screen on which various settings can be made is displayed on the display unit 28. The user can intuitively make various settings by using the menu screen displayed on the display unit 28, the four-way directional pad 74, and the set button 75.

A communication terminal 10 is used for the digital camera 100 to communicate with a lens unit 150 (detachable) to be described below. An eyepiece unit 16 is an eyepiece unit of an eyepiece viewfinder (look-through viewfinder). The user can visually observe a video image displayed on an electronic viewfinder (EVF) 29 inside through the eyepiece unit 16. An eye-proximity detection unit 57 is an eye detection sensor that detects whether the eye of the user (photographer) is in proximity to the eyepiece unit 16. A lid 202 is for a slot where the recording medium 200 is accommodated. A grip part 90 is a holding part having a shape easy for the user to grip by the right hand when holding the digital camera 100. The shutter button 61 and the main electronic dial 71 are located at positions operable by the index finger of the right hand when the user holds the digital camera 100 by gripping the grip part 90 with the little finger, the ring finger, and the middle finger of the right hand. The sub electronic dial 73 is located at a position operable by the thumb of the right hand in the same state.

Figure 2:
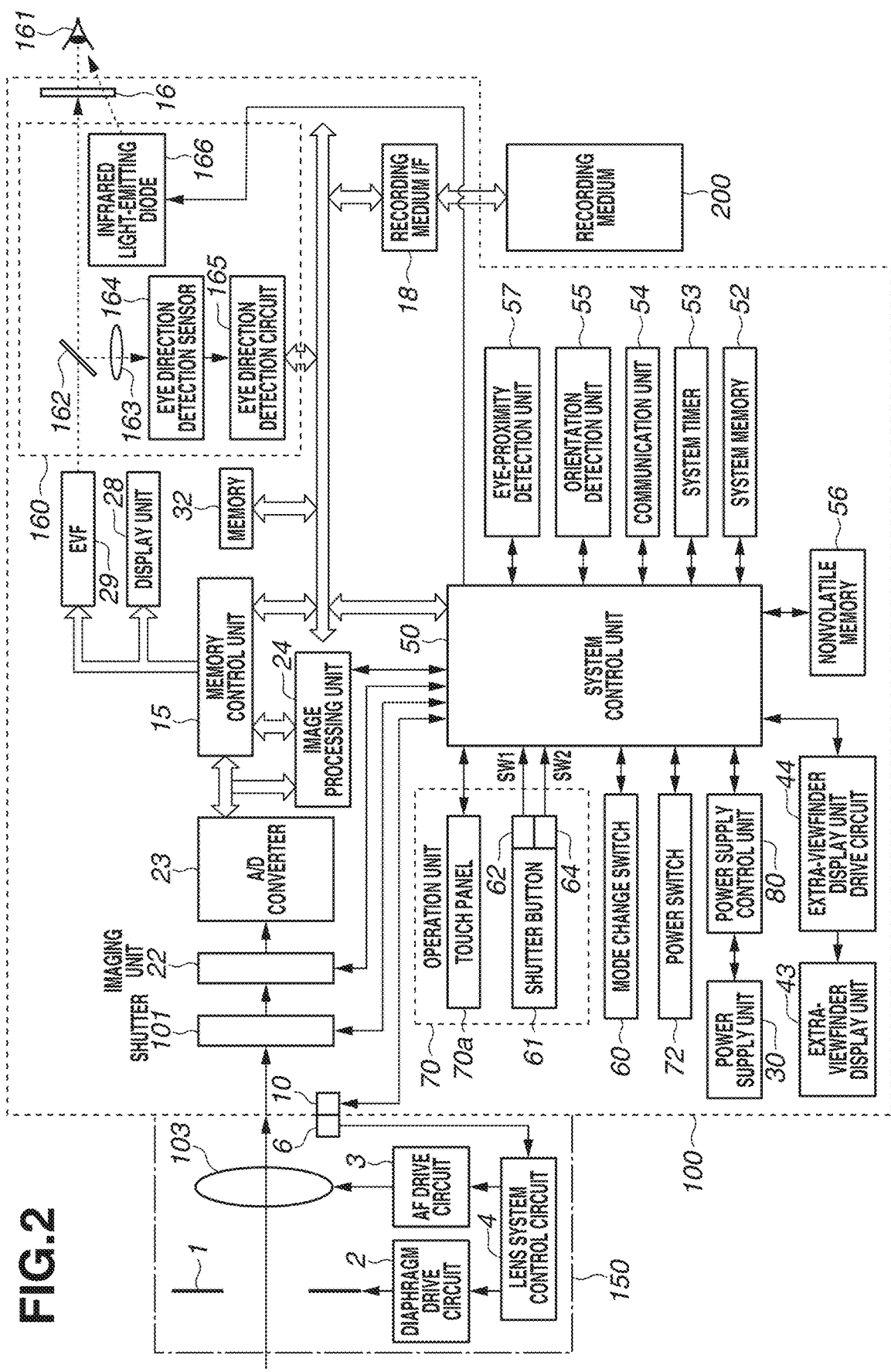
FIG. 2 is a block diagram illustrating a configuration of the digital camera that is the exemplary embodiment of the present invention.

FIG. 2 is a block diagram illustrating a configuration example of the digital camera 100 according to the present exemplary embodiment. In FIG. 2, the lens unit 150 includes an interchangeable imaging lens. A lens 103 typically comprises a plurality of lenses, but is simplified and depicted as a single lens in FIG. 2. A communication terminal 6 allows the lens unit 150 to communicate with the digital camera 100. The lens unit 150 communicates with a system control unit 50 via the communication terminal 6 and the foregoing communication terminal 10. A diaphragm 1 is controlled via a diaphragm drive circuit 2 by using a lens system control circuit 4 inside. The lens 103 is then displaced for focusing via an automatic focus (AF) drive circuit 3.

A shutter 101 is a focal plane shutter that can freely control an exposure time of an imaging unit 22 based on control by the system control unit 50.

The imaging unit 22 is an image sensor including a charge-coupled device (CCD) sensor or complementary metal-oxide-semiconductor (CMOS) sensor that converts an optical image into an electrical signal. An analog-to-digital (A/D) converter 23 is used to convert an analog signal output from the imaging unit 22 into a digital signal.

An image processing unit 24 performs predetermined resize processing, such as pixel interpolation and reduction, and color conversion processing on data from the A/D converter 23 or data from a memory control unit 15 (described below). The image processing unit 24 performs predetermined calculation processing by using captured image data. The system control unit 50 performs exposure control and ranging control based on the calculation result obtained by the image processing unit 24. Through-the-lens (TTL) AF processing, AE processing, and electronic flash (EF) (preliminary flash emission) processing are thereby performed. The image processing unit 24 further performs predetermined calculation processing by using the captured image data, and performs TTL automatic white balance (AWB) processing based on the obtained calculation result.

The memory control unit 15 controls data transmission and reception between the A/D converter 23, the image processing unit 24, and a memory 32. Output data from the A/D converter 23 is written to the memory 32 via the image processing unit 24 and the memory control unit 15, or directly via the memory control unit 15. The memory 32 stores image data that is obtained by the imaging unit 22 and digitally converted by the A/D converter 23, and image data to be displayed on the display unit 28 and the EVF 29. The memory 32 has a sufficient storage capacity to store a predetermined number of still images and a predetermined duration of moving images and audio data.

The memory 32 also serves as an image display memory (video memory). The image display data written to the memory 32 is displayed on the display unit 28 and the EVF 29 via the memory control unit 15. The display unit 28 and the EVF 29 provide display based on the signal from the memory control unit 15 on a display device, such as a liquid crystal display (LCD) and an organic electroluminescence (EL) display. An LV display can be provided by successively transferring data that is A/D-converted by the A/D converter 23 and stored in the memory 32 to the display unit 28 or the EVF 29 for display. An image displayed by the LV display will hereinafter be referred to as an LV image.

An infrared light-emitting diode 166 detects a position at which an eye of the user is directed on the screen inside the EVF 29. The infrared light-emitting diode 166 irradiates an eyeball (eye) 161 of the user with infrared rays. The infrared rays emitted from the infrared light-emitting diode 166 are reflected by the eyeball (eye) 161, and the reflected infrared rays reach a dichroic mirror 162. The dichroic mirror 162 reflects only infrared rays and transmits visible light. The reflected infrared rays along the changed optical path forms an image on the imaging surface of an eye direction detection sensor 164 via an image forming lens 163. The image forming lens 163 is an optical member constituting an eye tracking optical system. The eye direction detection sensor 164 includes an imaging device such as a CCD image sensor.

The eye direction detection sensor 164 photoelectrically converts the incident reflected infrared rays into an electrical signal and outputs the electrical signal to an eye direction detection circuit 165. The eye direction detection circuit 165 includes at least one processor. The eye direction detect circuit 165 includes at least one processor, detects the eye direction position from an image or the movement of the eyeball (eye) 161 of the user, based on the output signal of the eye direction detection sensor 164, and outputs detection information to the system control unit 50. The dichroic mirror 162, the image forming lens 163, the eye direction detection sensor 164, the infrared light-emitting diode 166, and the eye direction detection circuit 165 thus constitute an eye tracking block 160.

In the present exemplary embodiment, the eye direction is detected by a method called a conical reflection method using the eye tracking block 160. In the conical reflection method, the eye direction and the eye direction position is detected from a positional relationship between a pupil of the eyeball (eye) 161 and reflected infrared light that has been emitted from the infrared-emitting diode 166 and reflected especially by a cornea of the eyeball (eye) 161. Aside from the corneal reflection method, there are various methods for detecting the eye direction and the eye direction position, such as a method called a limbus reflection method in which a difference in reflectance between a black part and a white part of an eye is utilized. A method using an eye tracking unit other than the foregoing may be used as long as the direction and position of the eye direction can be detected.

Various setting values of the digital camera 100, including a shutter speed and an aperture value, are displayed on the extra-viewfinder display unit 43 via an extra-viewfinder display unit drive circuit 44.

A nonvolatile memory 56 is an electrically erasable and recordable memory. Examples include a flash read-only memory (flash ROM). The nonvolatile memory 56 stores operating constants and a program of the system control unit 50. The program here refers to one for executing a flowchart to be described below in the present exemplary embodiment.

The system control unit 50 is a control unit including at least one processor or circuit, and controls the entire digital camera 100. The system control unit 50 implements various processes according to the present exemplary embodiment to be described below by executing the program recorded in the foregoing nonvolatile memory 56. A system memory 52 is a random access memory (RAM), for example. The operating constants of the system control unit 50, variables, and the program read from the nonvolatile memory 56 are loaded into the system memory 52. The system control unit 50 also performs display control by controlling the memory 32 and the display unit 28.

A system timer 53 is a clocking unit that measures time used for various controls and the time of a built-in clock.

The mode change switch 60, a first shutter switch 62, a second shutter switch 64, and the operation unit 70 include operation units for inputting various operation instructions to the system control unit 50. The mode change switch 60 switches an operation mode of the system control unit 50 to any one of still and moving image capturing modes. The still image capturing modes include the following modes: an automatic imaging mode, an automatic scene determination mode, a manual mode, an aperture priority mode (Av mode), a shutter speed priority mode (Tv mode), and a program AE mode (P mode), for example. Various types of scene modes, which include imaging settings specific to respective imaging scenes, and custom modes are also included. The user can directly switch to any one of the modes by using the mode change switch 60. Alternatively, the user may once switch to an imaging mode list screen by using the mode change switch 60, select one of a plurality of modes that is displayed, and then switch to the selected mode by using another operation member. Similarly, the moving imaging mode may include a plurality of modes.

The first shutter switch 62 is turned on by pressing a shutter button 61 on the digital camera 100 towards a halfway, i.e., half pressed (imaging preparation instruction), and generates a first shutter switch signal SW1. Based on the first shutter switch signal SW1, the system control unit 50 starts imaging preparation operations, such as the AF processing, the AE processing, the AWB processing, and the EF (preliminary flash emission) processing.

The second shutter switch 64 is turned on by pressing the shutter button 61 all the way, i.e., fully pressed (imaging instruction), and generates a second shutter switch signal SW2. Based on the second shutter switch signal SW2, the system control unit 50 starts a series of imaging processing operations from the reading of the signal from the imaging unit 22 to the writing of the captured image as an image file into the recording medium 200.

The operation unit 70 includes various operation members serving as input units for receiving operations from the user. The operation unit 70 includes at least the following operation members: the shutter button 61, the touch panel 70a, the main electronic dial 71, the power switch 72, the sub electronic dial 73, the four-way directional pad 74, the set button 75, the moving image button 76, the AE lock button 77, the zoom button 78, the playback button 79, and the menu button 81.

A power supply control unit 80 includes a battery detection circuit, a direct-current-to-direct current (DC-DC) converter, and a switch circuit for switching blocks to be energized. The power supply control unit 80 detects the presence or absence of a battery mounted, the type of battery, and the remaining battery level. The power supply control unit 80 controls the DC-DC converter based on detection results and instructions from the system control unit 50, and supplies predetermined voltages to various components including the recording medium 200 for predetermined periods. A power supply unit 30 includes a primary battery, such as an alkaline battery and a lithium battery, a secondary battery such as a nickel-cadmium (NiCd) battery, a nickel metal halide (NiMH) battery, and a lithium-ion (Li) battery, and/or an alternating current (AC) adapter.

A recording medium interface (I/F) 18 is an I/F with the recording medium 200, such as a memory card and a hard disk. The recording medium 200 is used for recording captured images, and includes a semiconductor memory or a magnetic disk.

A communication unit 54 connects to an external apparatus wirelessly or via a cable, and transmits and receives a video signal and an audio signal. The communication unit 54 can also connect to a wireless local area network (LAN) and the Internet. The communication unit 54 can communicate with an external apparatus by Bluetooth® and Bluetooth® Low Energy, for example. The communication unit 54 can transmit images (including an LV image) captured by the imaging unit 22 and images recorded on the recording medium 200, and receive images and various other types of information from an external apparatus.

An orientation detection unit 55 detects the orientation of the digital camera 100 with respect to the direction of gravity. Whether an image captured by the imaging unit 22 is in landscape or portrait can be determined based on the orientation detected by the orientation detection unit 55. The system control unit 50 can add orientation information based on the orientation detected by the orientation detection unit 55 to the image file of the image captured by the imaging unit 22, or rotate and record the image. An acceleration sensor or a gyro sensor can be used as the orientation detection unit 55, for example. The motion of the digital camera 100 (such as a pan, tilt, lift-up, and whether the digital camera 100 is at rest) can also be detected by using the acceleration sensor or gyro sensor that is the orientation detection unit 55.

The eye-proximity detection unit 57 is an eye detection sensor that detects an eye (an object) 161 is proximal to the eyepiece unit 16 of the eyepiece viewfinder in an eye proximity state and the eye (object) 161 is distant from the eyepiece unit 16 in an eye separation state. The system control unit 50 switches between display (display state) and non-display (non-display state) of the display unit 28 and the EVF 29 based on the state detected by the eye-proximity detection unit 57. More specifically, if at least the digital camera 100 is in an image capturing standby state, and a switching setting of a display destination of a live view image captured by the imaging unit 22 is set to an automatic switching setting, when the eye 161 is not in close-proximity to the eyepiece unit 16, the display destination is set to the display unit 28 and the display is set to ON, and the EVF 29 is brought into the non-displayed state. While the eye is in proximity of the eyepiece viewfinder, the system control unit 50 turns on display of the EVF 29 as the destination of display, and turns off display of the display unit 28. For example, the eye-proximity detection unit 57 can be an infrared proximity sensor, and can detect the presence of an object in proximity to the eyepiece unit 16 of the eyepiece viewfinder where the EVF 29 is built in. If an object is in proximity to the eyepiece unit 16, infrared rays projected from a light projection unit (not illustrated) of the eye-proximity detection unit 57 are reflected from the object and received by a light reception unit (not illustrated) of the infrared proximity sensor. How close the object has approached to the eyepiece unit 16 (eye approach distance) can also be determined based on the amount of infrared rays received. In such a manner, the eye-proximity detection unit 57 performs eye proximity detection for detecting a proximity distance of the object to the eyepiece unit 16. In the present exemplary embodiment, the light projection unit and the light reception unit of the eye-proximity detection unit 57 are separate devices from the infrared light-emitting diode 166 and the eye direction detection sensor 164 described above. However, the infrared light-emitting diode 166 may also serve as the light projection unit of the eye-proximity detection unit 57. The eye direction detection sensor 164 may also serve as the light reception unit. If an object approaching within a predetermined distance to the eyepiece unit 16 from in a non-eye approach state (non-proximity state) is detected, the eye-proximity detection unit 57 detects that an eye is in proximity to the eyepiece unit 16 (eye proximity). If the object present in proximity to the eyepiece unit 16 has been detected to move away with a predetermined distance or farther from the eyepiece unit 16, the eye-proximity detection unit 57 detects that eye is in the eye separation state to the eyepiece unit 57. The threshold for detecting eye proximity state and the threshold for detecting eye separation state may be made different by providing a hysteresis, for example. After the eye proximity state is detected, the eye proximity state maintains until the eye separation state is detected. After the eye separation state is detected, the eyepiece unit 16 is in the non-eye proximity state until the eye proximity state is detected. The infrared proximity sensor used in this embodiment is only an example, and other sensors that can detect the presence of a nearby eye or object may also be used as the eye-proximity detection unit 57.

Based on the output from the eye tracking block 160, the system control unit 50 can detect the following operations or states:

A state where an input of an eye direction of the user whose eye is in proximity to the eyepiece unit 16 is present;

A state where the user whose eye is in proximity to the eyepiece unit 16 is gazing;

That the user whose eye is in proximity to the eyepiece unit 16 looks away, or equivalently, an end of the eye direction input; and A state where the user whose eye is in proximity to the eyepiece unit 16 is not making an eye direction input.

As employed herein, gazing refers to a case where a directional movement of the eye of the user does not exceed a predetermined amount of movement in a predetermined time.

The touch panel 70*a* and the display unit 28 may be integrally configured. For example, the touch panel 70*a* is configured to have a light transmittance which is not interfering with the display of the display unit 28, and is attached to the top layer of the display surface of the display unit 28. Input coordinates of the touch panel 70*a* and display coordinates on the display screen of the display unit 28 are associated with each other. A graphical user interface (GUI) that enables the user to make operations as if directly operating the screen displayed on the display unit 28 can thereby be provided. The system control unit 50 can detect the following operations on or states of the touch panel 70a:

- a finger or pen not yet touching the touch panel 70a to touch the touch panel 70a, i.e., a start of a touch (hereinafter, referred to as a touch-down);
- a state where a finger or pen is currently touching the touch panel 70a (hereinafter, referred to as a touch-on);
- a finger or pen currently touching the touch panel 70a is making a move (hereinafter, referred to as a touch-move);
- a finger or pen having touched the touch panel 70a is released from the touch panel, i.e., an end of a touch (hereinafter, referred to as a touch-up); and
- a state where nothing touches the touch panel 70a (hereinafter, referred to as a touch-off).

If a touch-down is detected, a touch-on is consequently detected at the same time. After a touch-down, a touch-on usually continues to be detected unless a touch-up is detected. A touch-move is detected in a state where a touch-on is detected. If a touch-on is detected and the touch position does not move, a touch-move is not detected. After all the touching fingers and pen are detected to be touched up, a touch-off is detected.

Such operations and states and the position coordinates of the finger(s) and pen touching the touch panel 70a are notified to the system control unit 50 via an internal bus. The system control unit 50 determines what operation (touch operation) is made on the touch panel 70a based on the notified information. If a touch-move is made, the moving direction of the finger or pen moving on the touch panel 70a can be determined in terms of vertical and horizontal components, separately, on the touch panel 70a based on a change in the position coordinates. If a touch-move over a predetermined distance or more is detected, the system control unit 50 determines that a slide operation is made. An operation of quickly moving a finger touching the touch panel 70a by a certain distance and immediately releasing the finger will be referred to as a flick. In other words, a flick is an operation of quickly running a finger over the touch panel 70a as if flicking. If a touch-move over a predetermined distance or more is detected to be made at a predetermined speed or more and a touch-up is immediately detected, a flick can be determined to be made (a flick can be determined to be made after a slide operation). A touch operation of simultaneously touching a plurality of points (for example, two points) and bringing the touch positions close to each other is referred to as a pinch-in, and a touch operation of separating the touch positions from each other a pinch-out. A pinch-out and a pinch-in are referred to collectively as pinch operations (or simply pinches). The touch panel 70a may use any one of various systems of touch panels, including a resistive, capacitive, surface acoustic wave, infrared, electromagnetic induction, image recognition, and optical sensor systems. Some systems detect a touch based on contact with the touch panel, and some detect a touch based on approach of a finger or pen to the touch panel. Any of such systems may be used.

In the present exemplary embodiment, control processing of display of an AF frame based on an eye direction input operation on the digital camera 100 by a touch input operation will be described.

Figure 3:
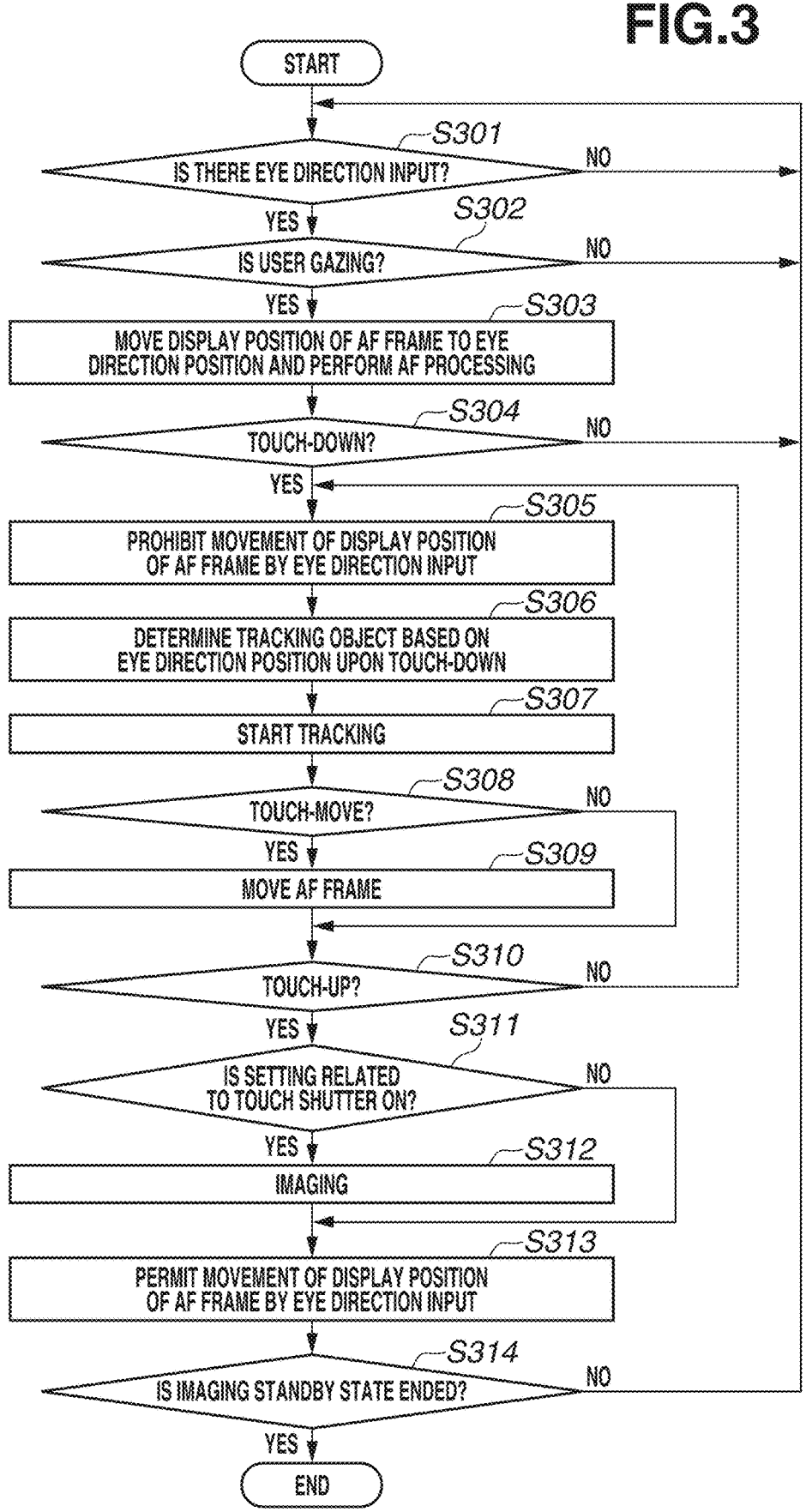
FIG. 3 is a flowchart illustrating processing for controlling an automatic focus (AF) frame based on an eye direction input according to a first exemplary embodiment of the present invention.
Figure 7:
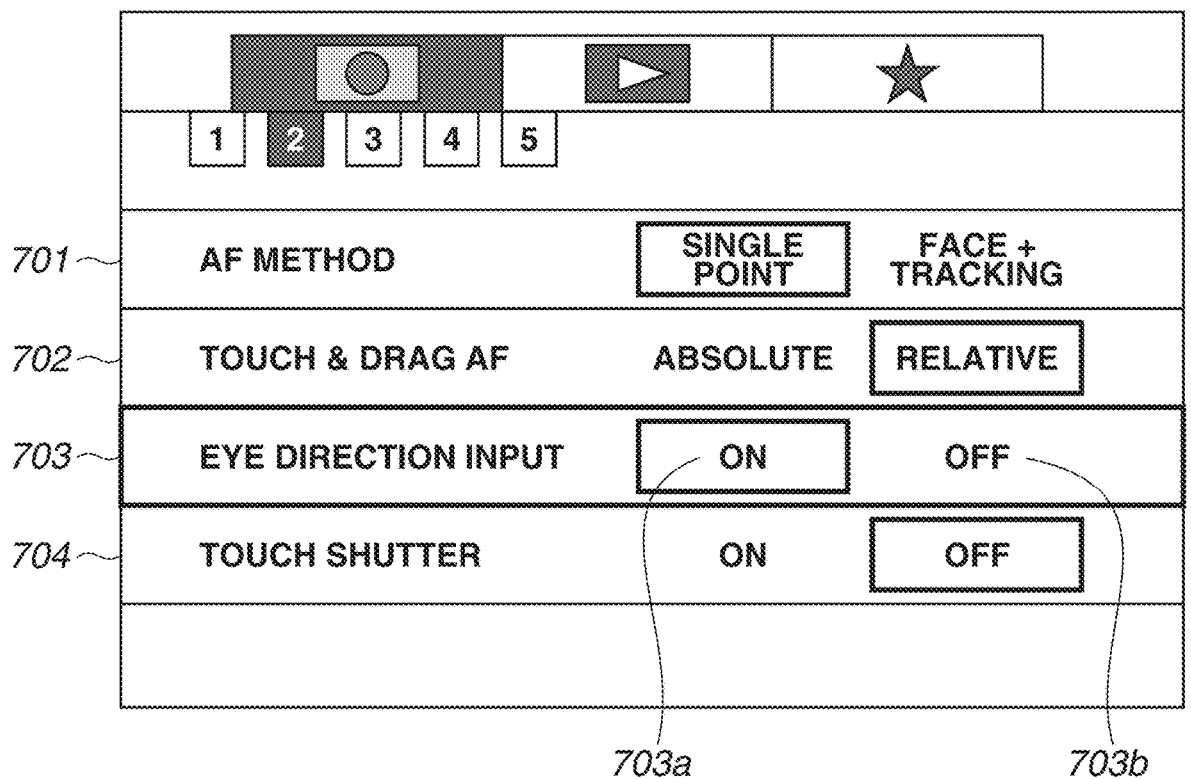
FIG. 7 illustrates a display example of a setting menu screen related to imaging according to the first exemplary embodiment of the present invention.

A first exemplary embodiment of the present invention will be described below. The present exemplary embodiment provides description of, the AF frame controlled to not be moved by an eye direction input while an operation on an operation member (in the present exemplary embodiment, the touch panel 70a) continues. FIG. 3 is a flowchart of control processing where the display of the AF frame based on an eye direction input is controlled by a touch operation. This control processing is implemented by the system control unit 50 loading the program stored in the nonvolatile memory 56 into the system memory 52 and executing the program. The flowchart of FIG. 3 is started if the digital camera 100 is activated in an imaging mode and the user looks into the EVF 29 in an imaging standby state, i.e., when the user is in a state where the user's eye is in proximity to the eyepiece unit 16 and a setting about the eye direction input is activated. FIG. 7 illustrating a setting menu screen related to imaging, displayed on the EVF 29 or the display unit 28. The setting menu screen displays setting items 701 to 704. Of these, the setting item 703 is one related to the eye direction input. The eye direction input refers to a function related to an operation made based on an eye direction of the user. The eye direction input can be set to either enabled or disabled. If a setting item 703a is selected, the setting related to the eye direction input is enabled. If a setting item 703b is selected, the setting related to the eye direction input is disabled. If the eye direction input is enabled, for example, an operation for selecting and moving the position of the AF frame by the eye direction can be made. If the eye direction input is disabled, for example, the operation for selecting and moving the position of the AF frame by the eye direction cannot be made. FIG. 7 illustrates that the setting of the eye direction input is enabled. The setting of the eye direction input is stored in the nonvolatile memory 56.

In step S301, the system control unit 50 determines the presence or absence of an eye direction input. If there is an eye direction input, i.e., the eye direction of the user is detected by the eye tracking block 160 (YES in step S301), the processing proceeds to step S302. If the eye direction of the user is not detected (NO in step S301), the processing returns to step S301. If an eye direction input is made, the system control unit 50 measures the time from when the eye direction input is started. For example, the eye tracking block 160 detects the eye direction position at every 30 msec, and transmits the detected eye direction position to the system control unit 50. The system control unit 50 determines whether the user is widely moving the eye direction (moving the eye direction around restlessly) or looking closely at a point (gazing) based on the eye direction position and the measured time. Gazing will be described below in step S302.

In step S302, the system control unit 50 determines whether the user is gazing. The system control unit 50 determines from the eye direction position and the measured time that the user is gazing if the amount of movement of the eye direction position in a predetermined time is less than or equal to a predetermined threshold. For example, the system control unit 50 determines that the user is gazing if the amount of movement of the eye direction position in 120 msec is less than or equal to a predetermined threshold. If the user is gazing (YES in step S302), the processing proceeds to step S303. If the user is not gazing (NO in step S302), the processing returns to step S301. While gazing is described here as a condition for determining that the eye direction position is one intended by the user in moving the display position of a focus detection area (hereinafter, AF frame) by the eye direction input, the blink of the user or a voice instruction may be used as the condition. Alternatively, the AF frame may be moved based on the detected position of the eye direction even without gazing (i.e., step S302 may be omitted so that the processing proceeds from step S301 to step S303). While 120 msec is described as a specific example of the time to be measured to determine gazing, the time to be measured may be set in advance, freely settable by the user, or variable based on a positional relationship between the position of the displayed AF frame and the position of gazing (gaze position).

In step S303, the system control unit 50 moves the display position of the AF frame to the eye direction (gaze) position detected in the EVF 29, and performs AF processing. If the gaze position (eye direction position) moves before the user makes a touch-down in step S304, the gaze position is detected over time as described in step S302 and the AF frame is moved to the gaze position. For example, the system control unit 50 moves the AF frame to the gaze position each time the user is determined to be gazing (at every predetermined time). While 120 msec is set as the period of time at which the AF frame is moved and updated based on the eye direction as with the time to determine gazing, the period may be set in advance or freely settable by the user. Reducing the update time period enables more accurate movement of the AF frame to the eye direction position, and the AF frame can follow the movement of the eye direction more quickly. Increasing the update time period can reduce annoyance to the user since the AF frame does not follow in small steps but somewhat roughly follows the movement of the eye direction position. The AF frame (select position) moving based on the eye direction moves smoothly to follow the moving track of the eye direction regardless of the foregoing update time. Specifically, even if the user moves the eye direction widely at high speed, the AF frame (select position) moves smoothly to follow the moving track of the eye direction without a jump from the previous display position to the detected position of the eye direction. In other words, if the update time period is short, the AF frame moves quickly to follow the movement of the eye direction without delay. If the update time period is long, the AF frame moves smoothly along the moving track of the eye direction. If the eye direction position (gaze position) detected by the eye tracking block 160 is detected to have moved from the position of the AF frame displayed on the EVF 29, the system control unit 50 moves the AF frame to follow the eye direction position regardless of whether the distance between the eye direction position and the position of the AF frame is large or small.

In step S304, the system control unit 50 determines whether a touch-down is made on the touch panel 70a. If a touch-down is made (YES in step S304), the processing proceeds to step S305. If not (NO in step S304), the processing returns to step S301.

In step S305, the system control unit 50 temporarily prohibits (restricts) the movement of the display position of the AF frame by the eye direction input. For example, in checking an icon or numerical value displayed on the EVF 29, the user can gaze at the area of the icon or numerical value. Such a gaze is not intended to move the display position of the AF frame by the eye direction input. If the AF frame moves in response to the gaze intended to check an icon or a numerical value, the AF frame can move to a position other than the user-desired position and the AF processing can be performed there. If the AF processing has been successfully performed at the user-desired position, the occurrence of the unintended movement of the AF frame annoys the user since the user has to gaze at the desired position again. If step S302 (gaze determination step) is omitted, the AF frame following the movement of the eye direction can annoy the user when the user widely moves the eye direction for reasons such as checking the entire image displayed on the EVF 29. The system control unit 50, if a touch-down operation is made on the touch panel 70a after the determination that the user is gazing (or there is an eye direction input), therefore temporarily prohibits or restricts the movement of the display position of the AF frame by the eye direction input while a touch operation continues. This prevents the movement of the AF frame in response to a change in the detected position of the eye direction while a touch-on continues from the touch-down to a touch-up. While the foregoing touch-on continues, at least part of the processing for detecting the eye direction (eye tracking processing) by the eye tracking block 160 may be suspended for power saving. The eye tracking processing suspended may be resumed after a touch-up.

In step S306, the system control unit 50 determines a tracking object for the AF frame to track based on the eye direction position upon the touch-down, specifically, before the touch-down operation is made or at the point when the touch-down operation is started.

In step S307, the system control unit 50 starts tracking the tracking object determined in step S306. In the first exemplary embodiment, suppose, for example, that the user selects a moving object by the AF frame based on the eye direction input in step S303. In such a case, since the user may want the AF frame to move in response to the movement of the object, the system control unit 50 tracks the object in steps S306 and S307. This, however, shall not apply if the user has selected one of a plurality of AF frames and made a setting to perform AF processing on the one point (AF frame). In such a case, the AF frame can move to a position other than the user-desired position if the AF frame is moved to track the movement of the object as in steps S306 and S307. If the user has made the foregoing setting to perform the AF processing on one point and the object on which the AF processing is performed in step S303 moves, the system control unit 50 may fix the AF frame to the user-desired point instead of determining the object to be a tracking object (instead of tracking the object). In other words, steps S306 and S307 may be omitted so that the processing proceeds from step S305 to step S308.

In step S308, the system control unit 50 determines whether a touch-move operation is made on the touch panel 70a. If a touch-move operation is made (YES in step S308), the processing proceeds to step S309. If not (NO in step S308), the processing proceeds to step S310.

In step S309, the system control unit 50 moves the AF frame displayed on the EVF 29 in step S303 by an amount corresponding to the amount of touch-move determined in step S308. That the user makes a touch-move on the touch panel 70a suggests that the user wants to move the AF frame moved by the eye direction input on the EVF 29 in the direction of the touch-move. The system control unit 50 therefore moves the AF frame displayed on the EVF 29 by the amount corresponding to the amount of touch-move. Details will be described below with reference to FIGS. 4E and 4F. The amount of movement of the AF frame on the EVF 29 corresponding to the amount of touch-move is calculated by multiplying the amount of touch-move by a coefficient. The smaller the coefficient, the smaller the amount of movement of the AF frame on the EVF 29 with respect to the amount of touch-move. This enables finer adjustments to the AF frame moved by the eye direction input.

The processing of steps S308 and S309 may be omitted so that the processing proceeds from step S307 to step S310. In other words, the AF frame may be not moved even if a touch-move is made.

In step S310, the system control unit 50 determines the presence or absence of a touch-up from the touch panel 70a. If a touch-up is made (YES in step S310), the processing proceeds to step S311. If a touch operation continues (NO in step S310), the processing returns to step S305.

In step S311, the system control unit 50 refers to the nonvolatile memory 56 and determines whether a setting related to a touch shutter is on. If the setting related to the touch shutter is on (YES in step S311), the processing proceeds to step S312. If the setting is off (NO in step S311), the processing proceeds to step S313. The touch shutter refers to a function of capturing an image (releasing the shutter) with a tap operation on the touch panel 70a. If the foregoing setting related to the touch shutter is on, the user can capture an image not only by pressing the shutter button 61 but also by making a tap operation on the touch panel 70a. This enables the user to intuitively specify a desired focus position and capture an image without missing a photo opportunity. That a touch-up is made in step S310 suggests that the user has completed checking icons, numerical values, and the entire image, and is ready for imaging. If the setting related to the touch shutter is on, the digital camera 100 here can perform imaging in response to the touch-up based on the touch shutter function without much possibility of being against the user's intention. If the setting related to the touch shutter is off, the digital camera 100 does not perform imaging in response to the touch-up (the processing proceeds from step S310 to step S313).

As a modification, in step S311, the system control unit 50 may determine whether to perform imaging by using the touch shutter based on the eye direction position of the user when the touch-up is made in step S310. Specifically, suppose that the AF processing is performed with an AF frame 212a illustrated in FIG. 4B. If the eye direction position of the user upon a touch-up from the touch panel 70a is in the vicinity of the AF frame 212a, imaging using the touch shutter is performed. The vicinity of the AF frame 212a refers to inside the AF frame 212a or within a predetermine range from the AF frame 212a. If the eye direction position of the user upon the touch-up is not in the vicinity of the AF frame 212a but at the position of a bird 214 as illustrated in FIG. 4D, the digital camera 100 does not performs imaging using the touch shutter. As illustrated by the AF frame 212a in FIG. 4H, the system control unit 50 then moves the AF frame 212a to the position of the bird 214 based on the eye direction input.

In step S312, the system control unit 50 performs imaging. The system control unit 50 performs imaging processing in response to the touch-up from the touch panel 70a in step S310 if the setting related to the touch shutter is on in step S311.

In step S313, the system control unit 50 permits the movement of the display position of the AF frame 212a by the eye direction input (lifts the temporal prohibition or restriction), which is temporarily prohibited or restricted in step S305. That a touch-up from the touch panel 70a is made in step S310 suggests that the user has finished checking the entire image and now intends to lift the restriction on the movement of the display position of the AF frame 212a by the eye direction input and resume moving the display position of the AF frame 212a by the eye direction input. The system control unit 50 therefore permits the temporarily-restricted movement of the display position of the AF frame 212a by the eye direction input. The processing proceeds to step S314.

In step S314, the system control unit 50 determines whether the imaging standby state is ended. If the imaging standby state is ended (YES in step S314), the present control flow ends. If the imaging standby state is not ended (NO in step S314), the processing returns to step S301.

If the first shutter switch 62 is turned on during the control flow of FIG. 3, the system control unit 50 performs the AF processing at the position of the AF frame 212a at that point in time. Specifically, if the AF frame 212a is displayed by the eye direction input, the system control unit 50 performs the AF processing at the position of the AF frame 212a displayed by the eye direction input. If the AF frame 212a is not displayed by the eye direction input, the AF processing is performed at a position determined by the system control unit 50. If the second shutter switch 64 is then turned on, the system control unit 50 performs imaging.

The movement of the display position of the AF frame 212a through the processing described in FIG. 3 will be described with reference to FIGS. 4A to 4H. FIGS. 4A, 4C, 4E, and 4G illustrate operation examples on the touch panel 70a. FIGS. 4B, 4D, 4F, and 4H illustrate display examples of the AF frame on the EVF 29 and examples of the eye direction position of the user's eye 161. Information display 213 is displayed on the EVF 29 along with the LV image. For example, information about imaging settings, such as a shutter speed, an aperture value, and an International Organization for Standardization (ISO) speed, and remaining battery level information, are displayed.

FIGS. 4A and 4B illustrates an operation example and a display example in steps S302 and S303 of FIG. 3. As can be seen from FIG. 4A, no touch operation is made on the touch panel 70a at the point of time in steps S302 and S303. The AF frame 212a in FIG. 4B indicates the position of the AF frame 212a displayed at the eye direction position of the eye 161 if the setting related to the eye direction input is enabled and the user is determined to be gazing. In FIG. 4B, the AF processing is performed on a flower 215 where the AF frame 212a is located. Without a touch-down on the touch panel 70a, the AF frame 212a follows the movement of the eye 161. More specifically, if the eye direction position of the eye 161 moves quickly to the bird 214, the AF frame moves quickly. If the eye direction position moves slowly from the flower 215 to the bird 214, the AF frame 212a also moves along the moving track of the eye direction position. The response time in which the AF frame 212a follows the eye direction position may be set to the same time as the determination time for determining gazing in step S302 (in the foregoing example, 120 msec), set to a different time in advance, or freely settable by the user. Instead of time-based movement, the AF frame 212a may be moved to jump to an object recognized by the system control unit 50 so that the AF processing can be performed on the recognized object. More specifically, if the shutter button 61 is pressed to perform imaging in the state of FIG. 4B, an image focused on the flower 215 is captured. Since an image focused on where the user is gazing can be captured without a moving operation on the AF frame 212a, the user can capture an image in a quick intuitive manner.

FIGS. 4C and 4D illustrate an operation example on the touch panel 70a and a display example of the AF frame 212a on the EVF 29 in steps S304 and S305 of FIG. 3, and an example of the eye direction position of the user. As illustrated in FIG. 4C, a touch operation (touch-down) is made on the touch panel 70a in step S304. In FIG. 4C, the user is making a touch (touch input 211a) near the center of the touch panel 70a. In the first exemplary embodiment, the movement of the AF frame 212a by the eye direction input is controlled depending on the presence or absence of a touch operation on the touch panel 70a regardless of the touch position on the touch panel 70a. Since the movement of the AF frame 212a by the eye direction input is temporarily prohibited or restricted in step S305, the AF frame 212a does not follow the eye direction position even if the eye direction position of the eye 161 moves from the position of the AF frame 212a while the touch operation on the touch panel 70a continues. Even if the user is gazing at the bird 214 at the eye direction position of the eye 161 in FIG. 4D, the AF frame 212a remains at the position of the AF frame 212a displayed when or before the touch-down is made as long as the touch operation on the touch panel 70a continues as in illustrated in FIG. 4C. In other words, the AF frame 212a does not move to the eye direction position. More specifically, if the shutter button 61 is pressed to perform imaging in the state of FIG. 4D, an image focused not on the bird 214 but on the flower 215 is captured. If the user wishes to bring the flower 215 into focus and capture an image at the timing or instant when the bird 214 rises up, an image focused on the flower 215 is desirably captured despite the eye direction position located at the bird 214. In other words, the eye direction position is desirably kept out of focus (the AF frame 212a is desirably not moved). This enables the user to capture an image at the user's appropriate timing while maintaining the position of the AF frame 212a that is quickly and intuitively specified by the eye direction input.

FIGS. 4E and 4F illustrate an operation example and a display example in steps S308 and S309 of FIG. 3. As described with reference to FIGS. 4C and 4D, the movement of the AF frame 212a by the eye direction input is temporarily restricted (the processing of steps S304 and S305) by a touch-down having been made on the touch panel 70a. As illustrated in FIG. 4D, the AF frame 212a is therefore not moved to the eye direction position even if the eye direction position of the eye 161 is at the bird 214. Now, as illustrated in FIG. 4E, suppose that a touch-move is made to move the touch input 211a to the position of a touch input 221b without a touch-up of the touch input 211a from the touch panel 70a. As illustrated in FIG. 4F, the AF frame 212a displayed on the EVF 29 when the touch input 211a is made (touch-down) is thereby moved to the position of an AF frame 212b by the touch-move. Here, the AF frame is moved on the EVF 29 by an amount corresponding to the amount of touch-move on the touch panel 70a, or by an amount of movement smaller than the amount corresponding to the amount of touch-move. The reason for this is that if the user moves the AF frame by the eye direction input and there are adjoining objects such as the flower 215 and a dog 216 in FIG. 4F, the AF frame may fail to move to the position desired by the user. The AF frame can be more accurately moved to the user-desired position by roughly specifying the AF frame by the eye direction input and then making a touch-move operation. The reason why the movement of the AF frame by the eye direction input is temporarily restricted here is to prevent the AF frame fine-adjusted by the touch-move from moving largely due to unintended movement of the eye direction. For example, suppose, in the foregoing case, that the user wants to bring the eye of the dog 216 into focus. In such a case, the user quickly sets an AF frame to near the face of the dog 216 (the position of the AF frame 212a) by the eye direction input, and makes a touch-move operation. The AF frame can be moved from near the face of the dog 216 (the position of the AF frame 212a), which is the position of the AF frame set by the eye direction input, to the position of the eye of the dog 216 (the position of the AF frame 212b) by slightly moving the AF frame by the touch-move operation.

FIGS. 4G and 4H illustrate an operation example and a display example in steps S310 and S313 of FIG. 3. As can be seen from FIG. 4G, a touch-up from the touch panel 70a is made in step S310, and no operation is being made on the touch panel 70a. Since the movement of the AF frame by the eye direction input, which has been temporarily prohibited or restricted, is permitted based on the touch-up from the touch panel 70a, the AF frame 212a moves to the eye direction position of the eye 161 (the AF frame 212a follows the eye direction position) as illustrated in FIG. 4H.

As can be seen from the control processing of FIG. 3 and FIGS. 4A to 4H, if the eye direction input by the user is enabled and the user is gazing, the AF frame is displayed at or moved to the eye direction position based on the eye direction input by the user. While a touch operation (touch-down) on the touch panel 70a continues, the AF frame is restricted to not follow the eye direction position even in the presence of the eye direction input by the user. The restriction enables the user to check the entire image and the setting values related to imaging with the AF frame kept displayed at a desired position while the user continues the touch operation on the touch panel 70a. If the user wants to move the AF frame by the eye direction input again, the user can end the touch operation (make a touch-up from the touch panel 70a). The user can thus switch whether to move the select position that is the AF frame by the eye direction input based on the presence or absence of a touch operation without annoyance. Since the switching can be made by a series of touch operations including a touch-down and a touch-up, inconvenience caused by the user switching to the state where the movement of the AF frame by the eye direction input is restricted and forgetting to restore the original, not-restricted state can be prevented.

The foregoing first exemplary embodiment has dealt with the case where the eye direction of the user looking into the EVF 29 is detected and whether to move the select position by the eye direction input is switched depending on a touch operation on the touch panel 70a. However, this is not restrictive. For example, the first exemplary embodiment is also applicable with pressing of the set button 75 instead of the touch operation according to the first exemplary embodiment. More specifically, if the AF frame 212a based on the eye direction input (gazing) is displayed on the EVF 29 (processing of step S303) and then the set button 75 is pressed (processing of step S304), the movement of the AF frame 212a by the eye direction input is temporarily prohibited or restricted (processing of step S305). If the pressing of the set button 75 is then ended (processing of step S310), the movement of the AF frame 212a by the eye direction input is permitted (processing of step S313) and the AF frame 212a is displayed at the eye direction position.

A second exemplary embodiment of the present invention will be described below. In the present exemplary embodiment, a case will be described where the movement of the display position of the AF frame by the eye direction input is controlled to be enabled only while an operation on an operation member (in the present exemplary embodiment, a touch panel 70a) continues. FIG. 5 is a flowchart of control processing for controlling the display of the AF frame by the eye direction input depending on a touch operation. The control processing is implemented by a system control unit 50 loading a program stored in a nonvolatile memory 56 into a system memory 52 and executing the program. As in the first exemplary embodiment, the processing of the flowchart in FIG. 5 is started when a digital camera 100 is activated in an imaging mode, the user is looking into an EVF 29 in an imaging standby state, i.e., in a state where the user's eye is in proximity to an eyepiece unit 16, and the setting related to the eye direction input is enabled.

In step S501, the system control unit 50 determines the presence or absence of a touch-down on the touch panel 70a. If a touch-down is made (YES in step S501), the processing proceeds to step S502. If not (NO in step S501), the processing returns to step S501.

In step S502, as in step S301 of FIG. 3, the system control unit 50 determines the presence or absence of an eye direction input.

In step S503, as in step S302 of FIG. 3, the system control unit 50 determines whether the user is gazing.

In step S504, as in step S303 of FIG. 3, the system control unit 50 moves the display position of the AF frame to the eye direction (gaze) position detected in the EVF 29, and performs AF processing. If the gaze position (eye direction position) moves while the touch operation made in step S501 continues, the gaze position is detected over time as described in step S503 and the AF frame is moved to the gaze position. If a touch-down on the touch panel 70a is started in step S501, the AF frame is moved by the eye direction input as long as the touch operation on the touch panel 70a continues. In other words, the AF frame is moved by the eye direction input without other operations, such as a touch-move and a touch-push to be described below, in addition to the touch-down. The user can thereby move the AF frame to the eye direction position quickly in an intuitive manner by using the eye direction. This enables the user to capture an image at user-desired timing and can reduce the possibility of missing a photo opportunity.

In step S505, as in step S310 of FIG. 3, the system control unit 50 determines the presence or absence of a touch-up from the touch panel 70a. If a touch-up is made (YES in step S505), the processing proceeds to step S506. If not (NO in step S505), the processing returns to step S502.

In step S506, as in step S305 of FIG. 3, the system control unit 50 temporarily prohibits (restricts) the movement of the display position of the AF frame by the eye direction input. As described above, if the user is determined to be gazing (or an eye direction input is determined to be made) while the touch panel 70a is touched on, the AF frame is displayed at the eye direction position in step S504. If a touch-up from the touch panel 70a is then made, the movement of the position of the AF frame by the eye direction input is temporality prohibited or restricted as long as no touch operation is made on the touch panel 70a. For example, the user can make a touch-down on the touch panel 70a with the intention of moving the AF frame by the eye direction input. Moving the AF frame to follow the eye direction during a touch-on is therefore less likely to annoy the user. In other words, the user can be expected to make a touch-up from the touch panel 70a if he/she wants the AF frame to not move to follow the eye direction. The movement of the AF frame by the eye direction input is therefore temporarily prohibited or restricted if a touch-up from the touch panel 70a is made. This enables the user to switch whether to move the AF frame by the eye direction input in an intuitive manner by a touch operation. In the period when the movement of the AF frame by the eye direction input is temporarily restricted, at least part of the eye tracking processing by an eye tracking block 160 may be suspended for power saving. The eye tracking processing suspended is resumed if a touch-down is made.

In step S507, as in step S311 of FIG. 3, the system control unit 50 refers to the nonvolatile memory 56 and determines whether the setting related to a touch shutter is on. If the setting related to the touch shutter is on (YES in step S507), the processing proceeds to step S508. If the setting is off (NO in step S507), the processing proceeds to step S509. That a touch-up operation is made in step S505 suggests that the user has completed checking the entire image and is ready for imaging. If the setting related to the touch shutter is on, the digital camera 100 here can capture an image in response to the touch-up based on the touch shutter function without much possibility of being against the user's intention. Alternatively, the system control unit 50 may determine whether to perform imaging using the touch shutter based on the eye direction position of the user upon the touch-up in step S505 regardless of the setting related to the touch shutter in step S507. More specifically, suppose that the AF processing is performed with an AF frame 212a in FIG. 6D. If the eye direction position of the user upon a touch-up from the touch panel 70a is in the vicinity of the AF frame 212a, imaging using the touch shutter may be performed. If the eye direction position of the user upon the touch-up is not in the vicinity of the AF frame 212a but at the position of a bird 214 in FIG. 6D, the system control unit 50 may move the AF frame 212a to the position of the AF frame 212a in FIG. 6H based on the eye direction input without performing imaging based on the touch shutter.

In step S508, as in step S312 of FIG. 3, the system control unit 50 performs imaging. The system control unit 50 performs imaging processing in response to the touch-up from the touch panel 70a in step S505 if the setting related to the touch shutter is on in step S507.

In step S509, as in step S306 of FIG. 3, the system control unit 50 determines a tracking object based on the eye direction position upon the touch-up (i.e., the eye direction position detected at the point in time when the determination of YES is made in step S505).

In step S510, as in step S307 of FIG. 3, the system control unit 50 starts tracking the tracking object determined in step S509. If the user has made a setting to perform AF processing a specific one of a plurality of AF frames, steps S509 and S510 may be omitted so that the processing proceeds from step S508 to step S511.

In step S511, the system control unit 50 determines whether the imaging standby state is ended. If the imaging standby state is ended (YES in step S511), the present control processing ends. If the imaging standby state is not ended (NO in step S511), the processing returns to step S501.

If the first shutter switch 62 is turned on during the control processing of FIG. 5, the system control unit 50 performs the AF processing at the position of the AF frame 212a at that point in time. More specifically, if the AF frame 212a is displayed by the eye direction input, the system control unit 50 performs the AF processing at the position of the AF frame 212a displayed by the eye direction input. If the AF frame 212a is not displayed by the eye direction input, the AF processing is performed at a position determined by the system control unit 50. If the second shutter switch 64 is then turned on, the system control unit 50 performs imaging.

The movement of the display position of the AF frame 212a by the processing described in FIG. 5 will be described with reference to FIGS. 6A to 6H. FIGS. 6A, 6C, 6E, and 6G illustrate operation examples on the touch panel 70a. FIGS.

6B, 6D, 6F, and 6H illustrate display examples of the AF frame on the EVF 29 and examples of the eye direction position of the user's eye 161.

FIGS. 6A and 6B illustrate an operation example and a display example (in particular, a display example immediately after a touch-down) in steps S501 to S504 of FIG. 5. As illustrated in FIG. 6A, a touch operation (touch-on) is made on the touch panel 70a. Since the touch operation is an operation intended to control the movement of the AF frame by the eye direction input depending on the presence or absence of a touch, the touch position does not matter. The AF frame 212a in FIG. 6B indicates the position of the AF frame 212a displayed at the eye direction position of the eye 161 in the case where a touch is made on the touch panel 70a, the setting related to the eye direction input is enabled, and the user is determined to be gazing. It can be seen from FIG. 6B that the user is looking at near the tail of a dog 216 displayed on the EVF 29. The AF frame 212a is thus displayed near the tail of the dog 216 that is the eye direction position.

As in FIGS. 6A and 6B, FIGS. 6C and 6D illustrate an operation example and a display example in steps S501 to S504 of FIG. 5. As illustrated in FIG. 6C, the user continues the touch operation on the touch panel 70a. The AF frame 212a based on the eye direction input by the user thus moves to follow the eye direction position. Since the eye 161 here is looking at a flower 215, the AF frame 212a moves from the tail of the dog 216 (position corresponding to the eye direction position in FIG. 6B) to the flower 215 (position corresponding to the eye direction position in FIG. 6D). As described in step S504 of FIG. 5, the AF frame 212a moves with the movement of the gaze position (eye direction position) over time while the movement of the display position of the AF frame 212a by the eye direction input is permitted. For example, as described in step S302 of FIG. 3 and step S503 of FIG. 5, the display position of the AF frame 212a is moved at every 120 msec that is the time for gaze determination. This time may be set in advance or freely settable by the user as long as the moving track of the eye direction of the user can be traced. Setting a shorter time enables the AF frame 212a to track the movement of the eye direction of the user in a more quick and sharp manner Setting a longer time can reduce annoyance to the user since the AF frame 212a does not move in small steps in response to the movement of the eye direction. In FIGS. 6B and 6D, the tail of the dog 216 and the flower 215 are at some distance from each other. As described in step S504 of FIG. 5, the AF frame 212a is moved to follow the eye direction position regardless of the distance between the eye direction position and the position of the AF frame 212a. FIGS. 6A and 6C illustrate a state where a touch input 211a does not move from the touch-down position, and the touch operation is continued, unlike a touch-push to be described below, without changing the pressure on the touch panel 70a. If the shutter button 61 is pressed to perform imaging in the states of FIGS. 6B and 6D, an image focused on the position corresponding to the eye direction position, i.e., the tail of the dog 216 and the flower 215, respectively, is captured. During a touch-on, an image focused on where the user is looking at can be captured without a moving operation on the AF frame 212a. This enables quick, intuitive imaging.

FIGS. 6E and 6F illustrate an operation example and a display example in steps S505 and S506. As illustrated in FIG. 6E, in step S505, the user has made a touch-up from the touch panel 70a and is not making any operation on the touch panel 70a. While no operation is made on the touch panel 70a, the movement of the AF frame by the eye direction input is temporarily prohibited or restricted (step S506). The AF frame 212a therefore does not follow the eye direction position even if the eye direction position of the eye 161 moves from the position of the AF frame 212a. Even if the user is gazing at the bird 214 at the eye direction position of the eye 161 in FIG. 6F, the AF frame 212a remains at the position of the AF frame 212a displayed when or before the touch-down is made, and does not follow the eye direction position as long as no touch operation is made on the touch panel 70a as illustrated in FIG. 6E. If the shutter button 61 is pressed at the point in time of FIGS. 6E and 6F, i.e., while no touch operation is made on the touch panel 70a, the system control unit 50 performs the AF processing at the position of the AF frame 212a instead of the bird 214 that is the eye direction position in FIG. 6F, and performs imaging. More specifically, if the shutter button 61 is pressed to perform imaging in the state of FIG. 6F, an image focused not on the bird 214 but on the flower 215 is captured. If the user wishes to bring the flower 215 into focus and capture an image at the timing or instant when the bird 214 rises up, an image focused on the flower 215 is desirably captured despite the eye direction position located at the bird 214. This enables the user to quickly and intuitively specify the position of the AF frame 212a by the eye direction input and capture an image at the user's appropriate timing.

FIGS. 6G and 6H illustrate an operation example and a display example in the processing returning from step S511 (NO in step S511) to step S501 of FIG. 5. FIGS. 6A to 6H illustrate operation examples and display examples in a case not involving the setting related to the touch shutter (steps S507 and S508 of FIG. 5 are omitted). FIG. 6G illustrates a state where a touch-down is made on the touch panel 70a (S501) in the state of FIGS. 6E and 6F. Since the movement of the AF frame 212a by the eye direction input, which has been temporarily prohibited or restricted, is permitted by the touch-down on the touch panel 70a, the AF frame 212a moves to the position of the eye direction input of the eye 161 (the position of the bird 214) as illustrated in FIG. 6H. For example, suppose that the user, at the point in time of FIG. 6F, wants to capture an image focused on the flower 215 at the instant when the bird 214 rises up. Suppose also that the user then changes his/her mind and wants to capture an image focused not on the flower 215 but on the bird 214. In such a case, the user can make a touch-down again to enable the eye direction input and bring the bird 214 at the eye direction position into focus. If the user presses the shutter button 61 to capture an image in the state of FIG. 6H, an image focused on the bird 214 at the position corresponding to the eye direction position is captured. The user can thus intuitively switch whether to move the AF frame by the eye direction input, and perform imaging.

As can be seen from the control processing of FIG. 5 and FIGS. 6A to 6H, if the user makes an eye direction input (gazing) while continuing a touch operation on the touch panel 70a, the AF frame 212a is moved to the eye direction position based on the eye direction input by the user while the touch operation continues. In a state where no operation is being made on the touch panel 70a after a touch-up from the touch panel 70a, the AF frame is restricted to not follow the eye direction position even if the user makes an eye direction input. The restriction enables the user to check the entire image and the setting values related to imaging with the AF frame kept displayed at a desired position. If the user wants to move the AF frame by the eye direction input again, the user can start a touch operation on the touch panel 70a and continue the touch operation as long as he/she wants to move the AF frame by the eye direction input. The user can thus switch whether to move the select position that is the AF frame by the eye direction input depending on the presence or absence of a touch operation without annoyance. Since the switching can be made by a series of touch operations including a touch-down and a touch-up, inconvenience caused by the user switching to the state where the movement of the AF frame by the eye direction input is restricted and forgetting to restore the original, temporarily restricted state, can be prevented.

The foregoing second exemplary embodiment has dealt with the case where the eye direction of the user looking into the EVF 29 is detected and whether to move the select position by the eye direction input is switched depending on a touch operation on the touch panel 70*a*. However, this is not restrictive. For example, the present exemplary embodiment is also applicable with pressing of a set button 75 instead of the touch operation according to the second exemplary embodiment. More specifically, if the user makes an eye direction input while continuing pressing the set button 75 (processing of step S501), the AF frame 212*a* is displayed on the EVF 29 based on the eye direction (gazing) (processing of step S504). If the pressing of the set button 75 ends (processing of step S505), the movement of the AF frame 212*a* by the eye direction input is temporarily prohibited or restricted (processing of step S506). In the second exemplary embodiment, whether to move the AF frame 212*a* by the eye direction input is controlled by using an operation member different from the shutter button 61, such as the touch panel 70*a* and the set button 75. This enables the user to switch whether to move the AF frame 212*a* by the eye direction input while maintaining the first shutter switch 62 or the second shutter switch 64 in an on state, by operating the foregoing operation member, such as the touch panel 70*a*. In other words, the user can intuitively switch the eye direction input and quickly capture an image.

In either of the foregoing first and second exemplary embodiments, the touch panel 70*a* may be configured to be capable of detecting pressure, and determination processing may be performed based on the pressure on the touch panel 70*a*. In other words, a pressure sensor (not illustrated) that detects pressuring force on the operation surface of the display unit 28 (operation surface of the touch panel 70*a*) and is intended to detect the strength of a touch operation may be included. The pressure sensor can continuously detect the strength of the pressing force when the display unit 28 is pressed by a touch operation. One or a plurality of distortion gauge sensors may be installed as the pressure sensor at a portion or portions that can be distorted by the pressing force on the operation surface of the display unit 28. The pressure sensor detects the pressing force on the operation panel of the touch panel 70*a* based on an output value or values of the distortion gauge sensor(s). Alternatively, a capacitance sensor may be installed in parallel with the touch panel 70*a*. A distance between the finger on the operation surface and the capacitance sensor can be calculated from a capacitance value resulting from the distortion of the operation surface of the touch panel 70*a* caused by the pressing force. The pressure then may be calculated based on the distance, or the distance may be handled as equivalent to the pressure. Pressure sensors of other methods may be used as long as the pressing force on the operation surface of the touch panel 70*a* can be detected. For example, if a stylus is used to make an operation on the operation surface, a sensor that is included in the stylus and detects pressure on the tip of the stylus may be used. The strength (pressing force) of the touch operation may be detected based on the output from the sensor. A sensor that detects a substitute for the touching force or touching pressure on the operation surface (such as the foregoing distance between the finger on the operation surface and the capacitance sensor) may be used. The strength (pressure) of a touch operation may be detected by using various methods, various sensors, and combinations of a plurality of sensors (for example, by weighted averaging). The pressure sensor may be integrated with the touch panel 70*a*. An pressing operation on the operation surface of the display unit 28 will hereinafter be referred to as a touch-push.

Specifically, suppose that a digital camera 100 includes a touch panel 70*a* including such a pressure sensor. If a touch-push is made after the touch-down in step S304 of FIG. 3 according to the first exemplary embodiment, the digital camera 100 may prohibit the movement of the AF frame by the eye direction input in step S305 of FIG. 3. More specifically, the movement of the AF frame by the eye direction input is not prohibited based only on a touch-on, but the position of the AF frame at the point in time when a touch-push is made is applied. This enables the user to more accurately determine the position of the AF frame by the eye direction input. If a touch-push is made after the touch-down in step S501 of FIG. 5 according to the second exemplary embodiment, the digital camera 100 may display the AF frame at the eye direction position in step S504 of FIG. 5. Since the AF frame is not displayed even if the eye direction input is detected during a touch-on but is displayed at the eye direction position in response to a touch-push, the AF frame is not continuously displayed based on the eye direction. This can reduce annoyance to the user.

As described above, in either of the first and second exemplary embodiments, the display of the AF frame by the eye direction input is controlled by a touch operation. The user can thus switch whether to move the select position that is the AF frame by the eye direction input depending on the presence or absence of a touch operation without annoyance. Since the switching can be made by a series of touch operations including a touch-down and a touch-up, inconvenience caused by the user forgetting to restore the original state after the switching can be prevented. In other words, the user can be prevented from confusing which the current state is (whether the eye direction input is enabled or disabled).

Figure 8:
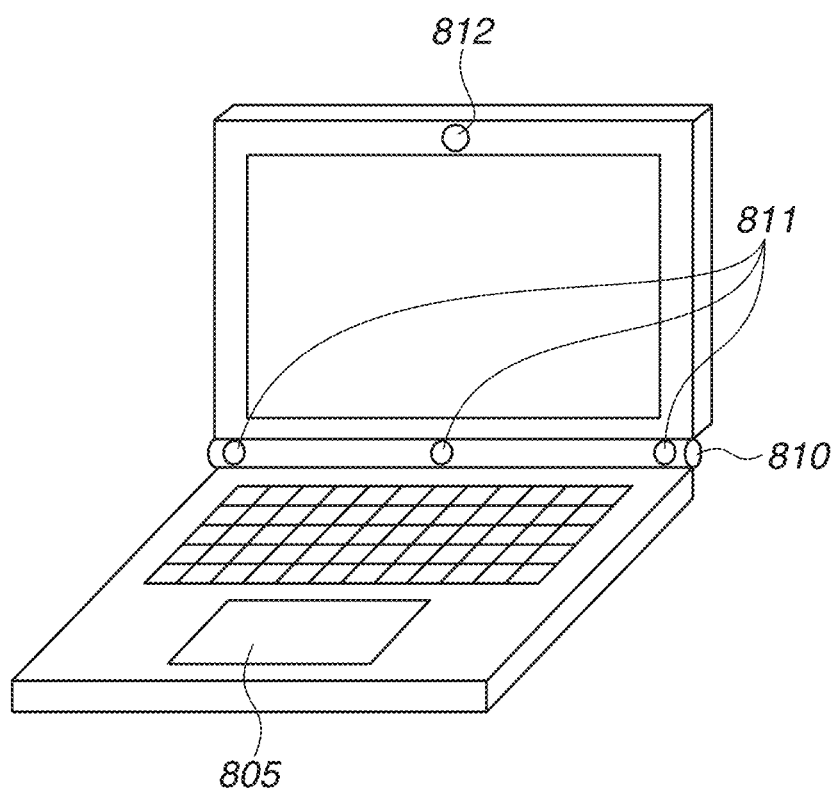
FIG. 8 is a diagram illustrating an exemplary embodiment of the present invention without a viewfinder.

In the foregoing first and second exemplary embodiments, the digital camera 100 is described to include the EVF 29. However, this is not restrictive. An exemplary embodiment of the present invention is also applicable without the EVF 29. FIG. 8 illustrates an example where a mouse pointer displayed on a monitor of a notebook personal computer including a touch pad is moved by an eye direction input. In FIG. 8, a touch pad 805 corresponds to the touch panel 70*a* according to the first and second exemplary embodiments. An independent eye tracking device 810 is connected to the notebook personal computer as an eye tracking block 160 for the notebook personal computer. An eye direction position is determined by using cameras 811 included in the eye tracking device 810 and a built-in camera 812 of the notebook personal computer. As in the first and second exemplary embodiments, the notebook personal computer switches whether to move the mouse pointer by the eye direction input depending on the presence or absence of a touch operation on the touch pad 805. If the first exemplary embodiment is applied to the notebook personal computer, the movement of the mouse pointer by the eye direction input is restricted while a touch-on on the touch pad 805 continues. The movement of the mouse pointer by the eye direction input is permitted while no touch operation is made on the touch pad 805. If the second exemplary embodiment is applied, the movement of the mouse pointer by the eye direction input is restricted while no touch operation is made on the touch pad 805. The movement of the mouse pointer by the eye direction input is permitted while a touch-on continues.

Some touch pads are capable of being pushed like a click operation. If the touch pad 805 is one capable of being pushed, the eye direction input may be permitted or restricted depending on the pushing of the touch pad 805 as with the foregoing set button 75. The mouse pointer may be hidden during a touch-on even if the eye direction input is detected, and the position of the mouse pointer at the point in time when the touch pad 805 is pushed may be applied as with the foregoing touch-push.

While FIG. 8 illustrates a notebook personal computer as another exemplary embodiment, the exemplary embodiment is also applicable to any apparatus that includes an operation member capable of a tap operation or pushing, such as a mouse and a pointing device. In the case of a mouse, the eye direction input is permitted or restricted while a click operation is continued. In the case of a pointing device including an operation member capable of a touch operation, the eye direction input is permitted or restricted while a touch operation is continued. In the case of an operation member capable of being pushed, like the foregoing set button 75, the eye direction input is permitted or restricted during pushing. The touch pad, mouse, or pointing device does not need to be built in the notebook personal computer and may be an external one.

As described above, if the user makes an eye direction input without operating the operation member, the display position is moved by the eye direction input while the operation member is not operated. The movement of the display position by the eye direction input is temporarily restricted while an operation on the operation member is continued. The movement of the display position by the eye direction input is permitted if the operation on the operation member is ended. If the user makes an eye direction input when operating the operation member, the display position is moved by the eye direction input while a touch operation is being made (touch operation is continued). The movement of the display position by the eye direction input is temporarily restricted while no touch operation is made. If a touch operation is made again, the movement of the display position by the eye direction input is permitted. Whether to move the display position by the eye direction input can thus be switched more quickly depending on the presence or absence of a touch operation.

The foregoing various controls described to be performed by the system control unit 50 may be implemented by a single hardware device. A plurality of hardware devices (such as a plurality of processors and circuits) may control the entire apparatus by sharing processing.

While the exemplary embodiments of the present invention have been described in detail, the present invention is not limited to such specific exemplary embodiments. Various implementations made without departing from the gist of the present invention are also included in the present invention. While the touch panel 70a is described as an example of a position movement instruction member to be used in combination with the eye direction input, other operation units, such as a button and a dial, may be used. While the display position is described to refer to the AF frame, an icon frame or a parameter setting frame may be used instead. Indicator display different from the AF frame, such a mouse pointer, may be used. While the time elapsed after a start of the eye direction input to the eye tracking block 160 is used as a criterion for determining gazing, the time to elapse may be set in advance, changed based on a positional relationship between the displayed AF frame and the eye direction position, or freely settable by the user. In the foregoing exemplary embodiments, gazing is described to be used as a criterion for determining whether the eye direction position is one intended by the user. However, whether the eye direction position is one intended by the user may be determined based not on the gazing-based determination criterion but only on whether the eye direction input setting (the eye direction input on the setting item 703 of FIG. 7) is enabled or disabled.

The foregoing first and second exemplary embodiments have been described by using the cases where the exemplary embodiments are applied to a digital camera as examples. However, such examples are not restrictive. An exemplary embodiment of the present invention is applicable to any electronic apparatus including an eye direction reception unit capable of receiving an eye direction input. In addition, the exemplary embodiments may be combined as appropriate. In the first and second exemplary embodiments, the digital camera 100 is described to use the EVF 29 and the eye tracking. However, an exemplary embodiment of the present invention is also applicable to a configuration using a display device other than the EVF 29 and the eye tracking. Specifically, an exemplary embodiment of the present invention can be applied to a personal computer, a personal digital assistant (PDA), a mobile phone terminal, a portable image viewer, a printer apparatus including a display, a digital photo frame, and a music player. A game machine, an electronic book reader, and a wearable device, such as a head-mounted display, are also applicable.

According to an exemplary embodiment of the present invention, whether to move the select position by the eye direction input can be switched according to the intention of the user without annoying the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-112316, filed Jun. 17, 2019, which is hereby incorporated by reference herein in its entirety.

What is claimed is:

1. An electronic apparatus comprising at least one memory and at least one processor which functions as:
an eye direction reception unit configured to receive an eye direction input of a selected position based on an eye tracking process;
an operation reception unit configured to receive a touch operation on a region of a specific operation member, the operation reception unit being configured to receive a moving operation for moving the selected position and a predetermined operation different from the moving operation on the specific operation member; and
a control unit configured to perform control such that the selected position is not moved based on the eye direction input in a case where the predetermined operation is being made, and the selected position is moved based on the eye direction input in a case where the predetermined operation is not being made.

2. The electronic apparatus according to claim 1, wherein the moving operation is for moving the selected position with a touch on the region being continued, and
wherein the predetermined operation is the touch on the region.

3. The electronic apparatus according to claim 1, wherein the control unit is configured to control, in a case where the moving operation is made while the predetermined operation on the specific operation member continues, the movement of the selected position based on the moving operation.

4. The electronic apparatus according to claim 1, wherein the control unit is configured to perform control such that the selected position is moved to follow an eye direction position at a predetermined interval in a case where the selected position is moved based on the eye direction input.

5. The electronic apparatus according to claim 1, wherein the control unit is configured to control execution of imaging processing in response to an end of the touch operation on the specific operation member.

6. The electronic apparatus according to claim 1, wherein the control unit is configured to perform control such that, in a case where the selected position is moved based on the eye direction input, the selected position is moved to smoothly follow an eye direction position.

7. The electronic apparatus according to claim 1, wherein the control unit is configured to perform control, such that the selected position is moved to a position corresponding to the eye direction input regardless of a distance between the selected position and an eye direction position in a case where the selected position is moved based on the eye direction input.

8. The electronic apparatus according to claim 1, wherein the control unit is configured to perform control such that an indicator indicating a selected position is displayed at the selected position on a display.

9. A method for controlling an electronic apparatus, comprising:

receiving an eye direction input as eye direction reception, the eye direction input being an input of a selected position based on an eye tracking process;
receiving a touch operation on a region of a specific operation member as an operation reception, the operation reception including receiving a moving operation for moving a selected position and a predetermined operation different from the moving operation on the specific operation member; and
performing control such that the selected position is not moved based on the eye direction input in a case where the predetermined operation is being made, and the selected position is moved based on the eye direction input received by the eye direction in a case where the predetermined operation is not being made.

10. A non-transitory computer-readable recording medium storing a program that causes a computer to execute a control method of an electronic apparatus, the control method comprising:
receiving an eye direction input of a selected position based on an eye tracking process;
receiving a touch operation on a region of a specific operation member, the operation reception unit being configured to receive a moving operation for moving the selected position and a predetermined operation different from the moving operation on the specific operation member; and
performing control such that the selected position is not moved based on the eye direction input in a case where the predetermined operation is being made, and the selection position is moved based on the eye direction input in a case where the predetermined operation is not being made.

11. An electronic apparatus comprising:
a specific operation member configured to receive an operation; and
at least one memory and at least one processor which function as:
an eye direction reception unit configured to receive an eye direction input that is an input of a selected position based on an eye tracking process; and
a control unit configured to perform control such that, in a case where the specific operation member is being pressed, the selected position is not moved based on the eye direction input, and that, in a case where the specific operation member is not being pressed, the selected position is moved based on the eye direction input received by the eye direction reception unit.

12. The electronic apparatus according to claim 11, wherein the specific operation member is a push button to be pressed without a directional instruction.

13. The electronic apparatus according to claim 11, wherein the control unit is configured to perform control such that, in a case where the selected position is moved based on the eye direction input, the selected position is moved to follow an eye direction position at a predetermined interval.

14. A method for controlling an electronic apparatus including a specific operation member configured to receive an operation, the method comprising:
receiving an eye direction input of a selected position based on an eye tracking process; and
performing control such that the selected position is not moved based on the eye direction input in a case where the specific operation member is being pressed, and the selected position is moved based on the received eye direction input in a case where the specific operation member is not being pressed.

15. A non-transitory computer readable recording medium storing a program that causes a computer to execute a control method of an electronic apparatus, the control method comprising:
receiving an operation; and
receiving an eye direction input of a selected position based on an eye tracking process; and
performing control such that the selected position is not moved based on the eye direction input in a case where the specific operation member is being pressed, and the selected position is moved based on the eye direction input received by the eye direction reception unit in a case where the specific operation member is not being pressed.

16. An electronic apparatus comprising:
a first operation member configured to instruct an image sensor to capture an image;
a specific operation member different from the first operation member; and
at least one memory and at least one processor which function as:
an eye direction reception unit configured to receive an eye direction input of a selected position based on an eye tracking process; and
a control unit configured to perform control such that the selected position is not moved based on the eye direction input in a case where the specific operation member is not being operated, and that the selected position is moved based on the eye direction input received by the eye direction reception unit in a case where the specific operation member is being operated.

17. The electronic apparatus according to claim 16, wherein the specific operation member is configured to receive a touch operation.

18. The electronic apparatus according to claim 16, wherein the control unit is configured to perform control such that the selected position is moved to follow an eye direction position at a predetermined interval in a case where the selected position is moved based on the eye direction input.

19. The electronic apparatus according to claim 16, wherein the specific operation member is a push button.

20. A method for controlling an electronic apparatus including a first operation member configured to instruct an image sensor to capture an image and a specific operation member different from the first operation member, the method comprising:
receiving an eye direction input of a selected position based on an eye tracking process; and
performing control such that the selected position is not moved based on the eye direction input in a case where the specific operation member is not being operated, and the selected position is moved based on the received eye direction input in a case where the specific operation member is being operated.

21. A non-transitory computer-readable recording medium storing a program for causing a computer to function as the units of the electronic apparatus comprising:
a first operation member configured to instruct an image sensor to capture an image;
a specific operation member different from the first operation member; and
at least one memory and at least one processor which function as:
an eye direction reception unit configured to receive an eye direction input of a selected position based on an eye tracking process; and
a control unit configured to perform control such that the selected position is not moved based on the eye direction input in a case where the specific operation member is not being operated, and that the selected position is moved based on the eye direction input received by the eye direction reception unit in a case where the specific operation member is being operated.

22. An electronic apparatus comprising at least one memory and at least one processor which function as:
an eye direction reception unit configured to receive an eye direction input of a selected position based on an eye tracking process;
an operation reception unit configured to receive a touch operation on a region of a specific operation member; and
a control unit configured to perform control such that the selected position is not moved based on the eye direction input in a case where the specific operation member is not being touched, and that the selected position is moved based on the eye direction input received by the eye direction reception unit even without a touch operation for moving the selected position in a case where the specific operation member is being touched.

23. The electronic apparatus according to claim 22, wherein the control unit is configured to perform control such that the selected position is moved to follow an eye direction position at a predetermined interval in a case where the selected position is moved based on the eye direction input.

24. The electronic apparatus according to claim 22, wherein the control unit is configured to control execution of imaging processing in response to an end of the touch operation on the specific operation member.

25. The electronic apparatus according to claim 22, wherein the selected position based on the eye direction input is displayed on a display in a case where a condition that an amount of movement of a position where the eye direction input is detected within a predetermined time is less than or equal to a predetermined threshold is satisfied.

26. The electronic apparatus according to claim 22, wherein the selected position is a selected position for a focus detection area.

27. The electronic apparatus according to claim 22, further comprising:
a viewfinder; and
a display in the viewfinder,
wherein in a case where the selected position is moved based on the eye direction input, the selected position displayed on the display in the viewfinder is moved.

28. A method for controlling an electronic apparatus, comprising:
receiving, as eye direction reception, an eye direction input of a selected position based on an eye tracking process;
receiving, as operation reception, a touch operation on a region of a specific operation member; and
performing control such that the selected position is not moved based on the eye direction input in a case where the specific operation member is not being touched, and the selected position is moved based on the eye direction input received by the eye direction reception even without a touch operation for moving the selected position in a case where the specific operation member is being touched.

29. A non-transitory computer-readable recording medium storing a program that causes a computer to execute a control method of an electronic apparatus, the control method comprising:
  receiving an eye direction input of a selected position based on an eye tracking process;
  receiving a touch operation on a region of a specific operation member; and
  performing control such that the selected position is not moved based on the eye direction input in a case where the specific operation member is not being touched, and the selected position is moved based on the eye direction input received by the eye direction reception unit even without a touch operation for moving the selected position in a case where the specific operation member is being touched.

* * * * *